United States Patent
Lu et al.

(10) Patent No.: US 11,368,522 B2
(45) Date of Patent: Jun. 21, 2022

(54) LIGHTWEIGHT IOT INFORMATION MODEL

(71) Applicant: Convida Wireless, LLC, Wilmington, DE (US)

(72) Inventors: Guang Lu, Thornhill (CA); Dale N. Seed, Allentown, PA (US); Lijun Dong, San Diego, CA (US); Quang Ly, North Wales, PA (US); Shamim Akbar Rahman, Cote St. Luc (CA); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/469,078

(22) Filed: Sep. 8, 2021

(65) Prior Publication Data

US 2021/0409484 A1 Dec. 30, 2021

Related U.S. Application Data

(63) Continuation of application No. 16/875,245, filed on May 15, 2020, now Pat. No. 11,159,606, which is a (Continued)

(51) Int. Cl.
*H04M 11/00* (2006.01)
*H04L 29/08* (2006.01)
(Continued)

(52) U.S. Cl.
CPC .............. *H04L 67/10* (2013.01); *H04W 4/70* (2018.02)

(58) Field of Classification Search
CPC .................................. H04L 67/10; H04W 4/70
See application file for complete search history.

(56) References Cited

U.S. PATENT DOCUMENTS

| 5,509,123 A | 4/1996 | Dobbins et al. |
| 7,263,353 B2 * | 8/2007 | Forsberg ................. H04W 4/50 455/420 |

(Continued)

FOREIGN PATENT DOCUMENTS

| JP | 09-506752 A | 6/1997 |
| JP | 2004-048298 A | 2/2004 |

(Continued)

OTHER PUBLICATIONS

Lightweight Machine to Machine Technical Specification; OMA-TS-LightweightM2M-V1_0-20130412-D_RM, OMA-TS-LightweightM2M-V1_0-20130412-D_RM, Open Mobile Alliance (OMA), 4330 La Jolla Village Drive, Suite 110, San Diego, GA 92122, Apr. 12, 2013, 1-73, Retrieved from internet: URL:ftp/Public documents/DM/LightweighM2M/Permanent documents/ [retrieved on Apr. 12, 2013.

*Primary Examiner* — Christopher B Robinson
(74) *Attorney, Agent, or Firm* — BakerHostetler LLP

(57) ABSTRACT

A lightweight and extensible information model for machine-to-machine systems is disclosed. A service layer information management architecture uses three categories of atomic objects, subjects, actions, and descriptions. Information for use within the model is built using the atomic information objects. Application programming interfaces are used to perform operations and information processing by different nodes. Common service functions are used in the model as instances of a generic common service information model.

20 Claims, 19 Drawing Sheets

Related U.S. Application Data continuation of application No. 14/283,905, filed on May 21, 2014, now Pat. No. 10,708,341.

(60) Provisional application No. 61/825,640, filed on May 21, 2013.

(51) Int. Cl.
    *H04W 4/70* (2018.01)
    *H04L 67/10* (2022.01)

(56) References Cited

U.S. PATENT DOCUMENTS

| | | | |
|---|---|---|---|
| 7,853,922 B1 | 12/2010 | Szpak et al. | |
| 8,984,046 B2* | 3/2015 | Dhoolia | G06F 9/50 |
| | | | 709/224 |
| 9,395,956 B2* | 7/2016 | Maximilien | G06F 8/31 |
| 2005/0188201 A1 | 8/2005 | Sala et al. | |
| 2007/0004393 A1 | 1/2007 | Forsberg et al. | |
| 2009/0150474 A1 | 6/2009 | Schneider | |
| 2009/0234903 A1 | 9/2009 | Lomelli et al. | |
| 2012/0054341 A1 | 3/2012 | Donaghey et al. | |
| 2012/0084280 A1* | 4/2012 | Bouzas | G06Q 50/01 |
| | | | 707/723 |
| 2012/0118711 A1 | 5/2012 | Han | |
| 2012/0159176 A1 | 6/2012 | Ravindran et al. | |
| 2012/0324421 A1 | 12/2012 | Boeckenhauer et al. | |
| 2012/0331487 A1 | 12/2012 | Mikami | |
| 2013/0016657 A1 | 1/2013 | Muhanna et al. | |
| 2013/0066965 A1 | 3/2013 | Foti | |
| 2013/0132058 A1 | 5/2013 | Butler et al. | |
| 2013/0212159 A1* | 8/2013 | Vandikas | H04L 67/02 |
| | | | 709/203 |
| 2014/0089478 A1 | 3/2014 | Seed et al. | |
| 2014/0126581 A1 | 5/2014 | Wang et al. | |
| 2014/0181282 A1 | 6/2014 | Llorca et al. | |

FOREIGN PATENT DOCUMENTS

| | | | | |
|---|---|---|---|---|
| JP | 2006-172416 A | | 6/2006 | |
| JP | 2014-506764 A | | 3/2014 | |
| JP | 2017153161 A | * | 8/2017 | H04L 67/10 |
| KR | 10-2012-0002994 A | | 1/2012 | |
| WO | 95/26090 A1 | | 9/1995 | |
| WO | 2009/092115 A2 | | 7/2009 | |
| WO | 2011/108619 A1 | | 9/2011 | |
| WO | 2012/068465 A1 | | 5/2012 | |
| WO | 2012/109531 A2 | | 8/2012 | |
| WO | 2012/118711 A2 | | 9/2012 | |

* cited by examiner

- Instance Value = 1000   710
- Search Tag =meter1Reading2013; HydroXmeterReading2013   720
- Subject   730
- Data   740
- /www.HydroX.com/Subjects/meter1Data~12/01/2013   750
- meter1   760
- /www.HydroX.com/Descriptions/commonMeterReadingDescription; /www.HydroX.com/Subject/HydroControlApp   770

- Instance Value 610
- Search Tag 620
- Object Category 630
- Object Type 640
- Own Identifier 650
- Description 660
- Identifiers of associated instances 670

LIGHTWEIGHT IOT INFORMATION MODEL

CROSS-REFERENCE TO RELATED APPLICATIONS

This application is a continuation of U.S. patent application Ser. No. 16/875,245 filed May 15, 2020, which is a continuation of U.S. patent application Ser. No. 14/283,905 filed May 21, 2014, now U.S. Pat. No. 10,708,341 issued on Jul. 7, 2020, which claims the benefit of U.S. Provisional Patent Application No. 61/825,640, filed on May 21, 2013, the contents of which are hereby incorporated by reference herein.

BACKGROUND

Current network and communications technologies, such as machine-to-machine (M2M) technologies and the Internet, allow devices to communicate more directly with each other using wired and wireless communications systems. M2M technologies in particular enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

Resources within an M2M system may provide various services to entities in the system. These services may include any function that a resource may perform, such as providing content (e.g., surveillance video content, temperature measurements), device status (e.g., power remaining, storage space remaining, current operating mode), configuration information (e.g., policies) or any other information, or any other function that may be performed by an M2M entity. Communications regarding services, such as announcement of available services, requests for service, and responses to requests for service, are performed at the M2M service capabilities layer (SCL). The addressing of entities providing and receiving services is based on a complex tree structure that is not conducive to scaling and not flexible enough for the demands of evolving M2M systems.

SUMMARY

Embodiments disclosed herein include methods for generating, at a first entity in a network of connected entities, a request to perform an action that includes a source subject of a first subject information object type, wherein the first subject information object type is selected from a predetermined set of subject information object types, the specified action of a first action information object type, wherein the first action information object type is selected from a predetermined set of action information object types, and a target subject of a second subject information object type, wherein the second subject information object type is selected from the predetermined set of subject information object types. The request may be transmitted from the first entity to a second entity and may cause the second entity to perform the action based on the source subject and the target subject.

Embodiments disclosed herein further include an entity in a network of connected entities that, when executing instructions on a processor, performs operations including generating a request to perform an action that includes a source subject of a first subject information object type, wherein the first subject information object type is selected from a predetermined set of subject information object types, the action of a first action information object type, wherein the first action information object type is selected from a predetermined set of action information object types, and a target subject of a second subject information object type, wherein the second subject information object type is selected from the predetermined set of subject information object types. The entity may then transmit the request to a second entity and may cause the second entity to perform the action based on the source subject and the target subject.

Embodiments disclosed herein further include an entity in a network of connected entities that, when executing instructions on a processor, performs operations including receiving a request to perform an action that includes a source subject of a first subject information object type, wherein the first subject information object type is selected from a predetermined set of subject information object types, the action of a first action information object type, wherein the first action information object type is selected from a predetermined set of action information object types, and a target subject of a second subject information object type, wherein the second subject information object type is selected from the predetermined set of subject information object types. In response to receiving the request, the entity may generate an information object instance and transmit a response to a second entity indicating that the information object instance has been generated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 6 illustrates an exemplary atomic information object structure.

FIG. 7 illustrates an exemplary atomic information object structure.

DETAILED DESCRIPTION OF ILLUSTRATIVE EMBODIMENTS

The embodiments set forth herein may be described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements will be described. In a RESTful architecture, representations of uniquely addressable resources may be transferred between entities. One skilled in the art will recognize that implementations of the instant embodiments may vary while remaining within the scope of the present disclosure. One skilled in the art will also recognize that the disclosed exemplary embodiments, while sometimes described herein in reference to standards set forth by standards bodies such as the European Telecommunications Standards Institute (ETSI) and oneM2M, are not limited to implementations adhering to such standards. The disclosed embodiments may be implemented in systems that do not adhere to the standards established by these standards bodies and may be applied to any type of architecture or systems that has communicatively connected entities.

Note that although the terminology used herein may appear to be similar to terms used in descriptions of object oriented programming (OOP), the disclosed information models should not be construed to have any of the limitations or definitions of OOP. In OOP, an object represents a function that contains data and related operations. In the instant disclosure, an object may be an information model object that may fall within any of the three categories (subjects, actions, descriptions) set forth herein and discussed below.

As used herein, Common Service Function (CSF) refers to the M2M service capability function provided by a Common Service Layer. A Common Service Layer (CSL) may include M2M service functions that enable M2M applications through, for example, management, discovery, and policy enforcement. Also as used herein, entities may refer to devices, gateways, network servers, applications, and/or data. An information object may be a data type that can have any number of instantiations. Information management (IM) is a proposed function in the service layer that may manage information for storage and sharing. A node, as used herein, is a physical entity containing CSLs including the reference points associated with each instantiation of these layers. Uniform Resource Identifier (URI) may also be used herein, and is known to those skilled in the art.

Figure 1:
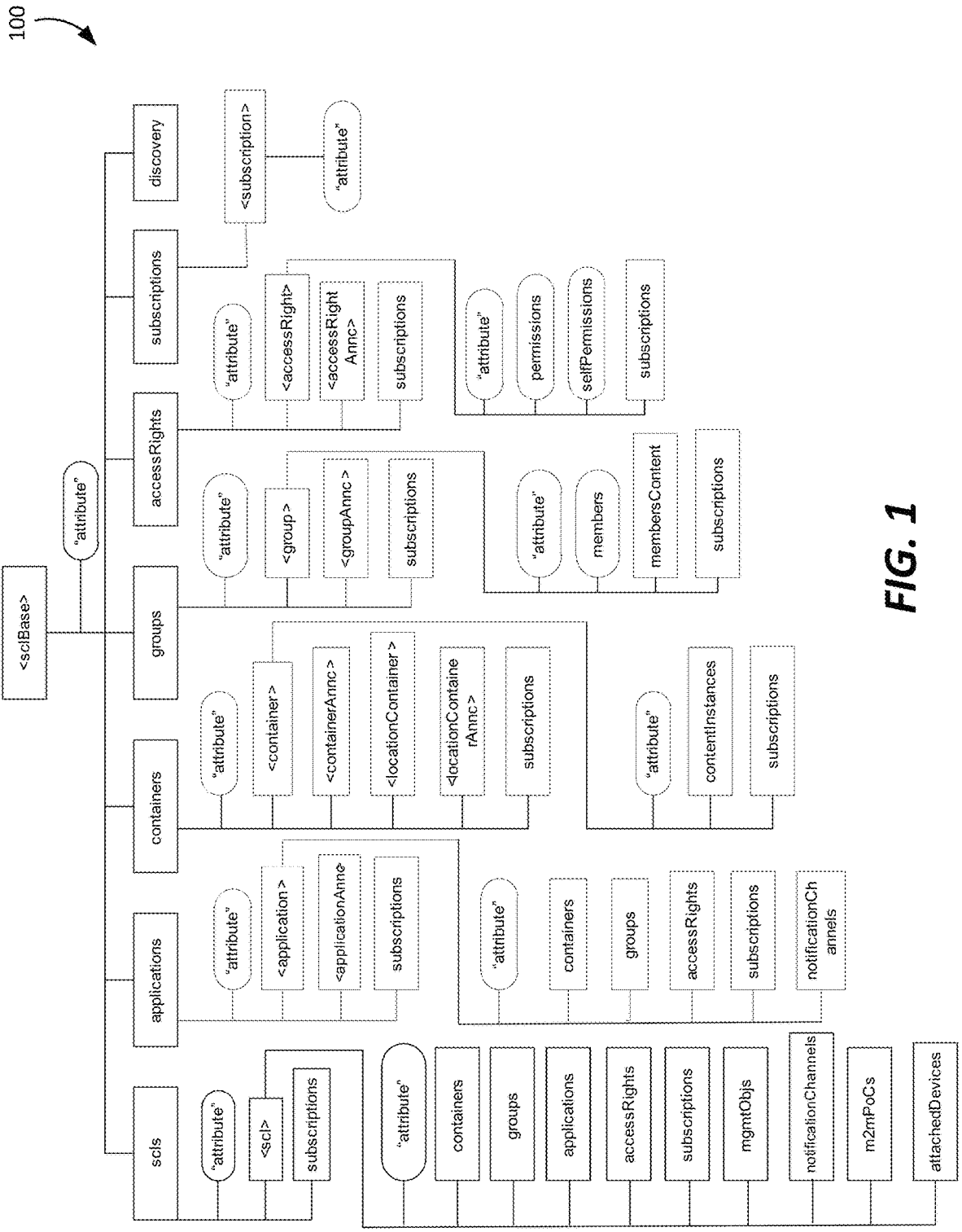
FIG. 1 illustrates an exemplary resource tree structure.

In some embodiments, particularly those adhering to the ETSI standard, resources may be organized by a resource tree structure, an example of which is shown in FIG. 1 as resource tree 100. As will be appreciated, as the functions of an M2M resource or entity grow and change, this tree structure may become very complex. Thus, M2M implementations making use of such a structure may have difficulty scaling up to handle a larger number of entities and services since the resource tree structures used in the system may become very large and therefore memory intensive, which may pose a problem for M2M entities that are physical resource-constrained (i.e., entities implemented on devices with small amounts of memory and/or processing capabilities). The addressing of sections of the tree structure may also become cumbersome. For example, using ETSI notation, to address a container in tree 100 may require an address such as "<sclBase>/scls/<scl>/applications/<applicationAnnc>/containers." When addressing resources that are several hops away from the addressee, the address becomes even more cumbersome as it requires additional address data to be successfully delivered to the intended recipient.

As can be appreciated, the ETSI M2M resource tree structure may be complex and may be difficult to scale up. Such a tree structure may have deep hierarchies and is best applied to a highly network service layer centric architecture. In this tree structure, data and the relationship of data are represented by their locations in the tree, but more complex scenarios, such as network to network, gateway to gateway, and device to device communications may be difficult to support because maintaining the tree structure over multiple hops may be difficult.

Figure 2:
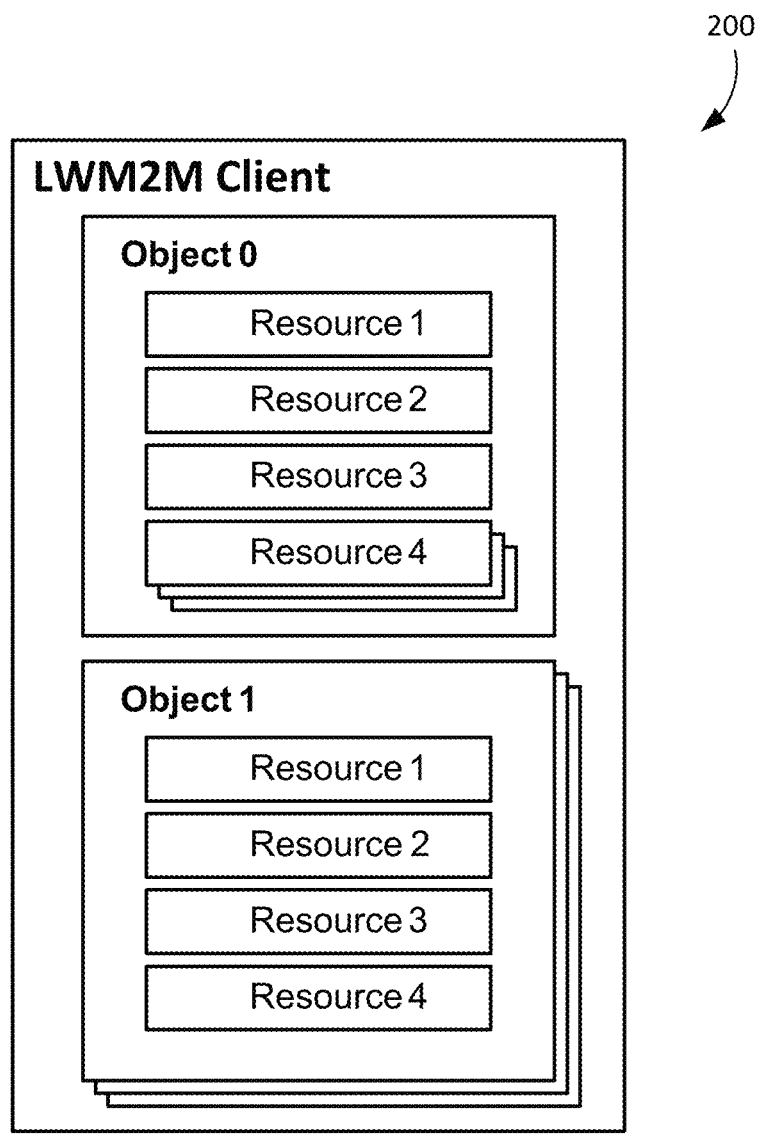
FIG. 2 illustrates an exemplary information object structure.

In other embodiments, such as those using the Open Mobile Alliance (OMA) lightweight M2M (LWM2M) information model, resources may be defined with unique identifiers and organized by client (i.e., entity) and object (i.e., a function provided by the client). Operations of the resource may be further defined. FIG. 2 illustrates example OMA LWM2M client 200 and its associated objects and resources. The OMA LWM2M information model does not support the association of a variety of information and only supports a single default application on a device, with which all objects are associated. The OMA LWM2M information model does not include a service layer or service layer objects. Thus, there is no support for multiple applications that may access and share services and data at a common service layer.

In M2M systems, and in the IoT generally, there may be fragmented vertical systems that may be referred to as "silos." In an embodiment, a horizontal service layer may be used to integrate such vertical systems together. A service layer may provide information services, such as data storing and sharing, for various vertical systems and applications.

By using a standardized information model, unified information services may be provided and interoperability may be increased.

The disclosed embodiments provide an information model for the M2M service layer that is flexible and scalable, and therefore may support a large number of M2M devices and applications as well as the dynamic and heterogeneous information they create. The disclosed information model may also support complex deployment scenarios and may be applicable to different types of entities, such as devices, gateways, and network nodes. In the disclosed embodiments, each node may also simultaneously support multiple applications. The disclosed information model may also facilitate efficient sharing of information between different entities.

As set forth herein in more detail, the embodiments described in this disclosure include an architecture for information management based on a high level common service layer architecture as well as information model embodiments for the M2M common service layer. In one embodiment, an information model may use atomic information objects. These objects may be "subjects", "actions", or "descriptions". In another embodiment, an information model may contain information objects that are based on service layer functions. Set forth below in more detail is the structure of an information object and a description of an exemplary information model that may be considered "lightweight" due to its granularity and flexibility. Also set forth herein are aspects of the disclosed embodiments related to storage and addressing, application programming interfaces (APIs), and extensibility. Examples of operations using the disclosed information model will also be described.

Figure 3:
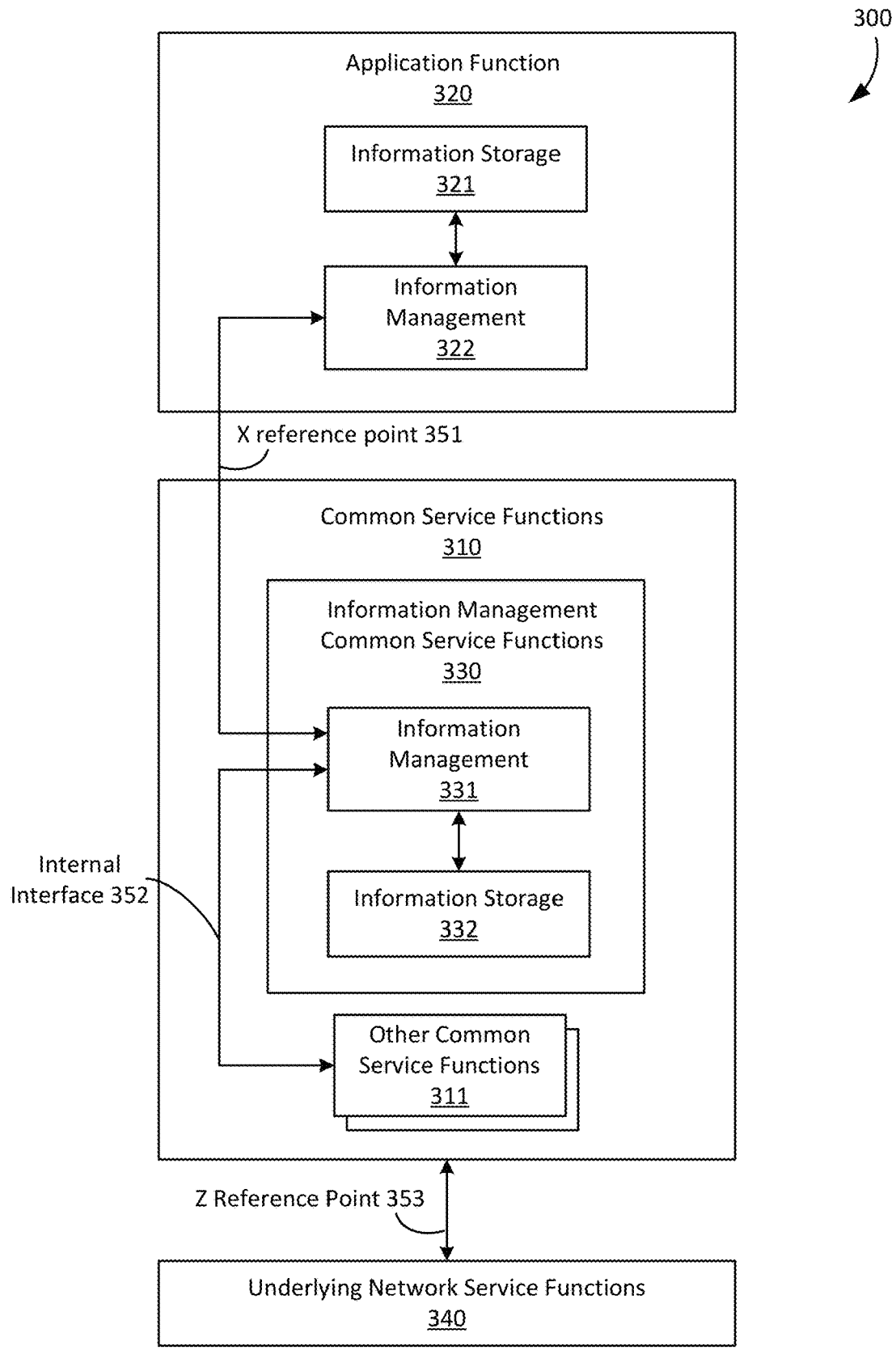
FIG. 3 illustrates an exemplary information management architecture.

FIG. 3 illustrates service layer architecture 300 for information management based on a proposed oneM2M service layer model. In an embodiment, Information Management (IM) Common Service Functions (CSF) 330 of CSF 310 may be used in the implementation and operation of an IoT lightweight information model. IM CSF 330 may have at least two components. One component may be IM component 331 that may address API operations and internal transactions. Another component may be information storage component 332 that may store information and data. IM CSF 330 may provide information storage and sharing functions to different service platforms and applications, such as application function (AF) 320 that may have its own information storage 321 and IM 322. IM CSF 330 may communicate with AF 320 using X reference point 351. Underlying network service functions 340 may be instructed or otherwise controlled via Z reference point 353.

In one embodiment, the disclosed information model may be based on atomic information objects that may be very small atomic information objects that may be used as building blocks by various service capabilities. Each information object may have more than one instantiation. Combination of these instantiations may form new information.

Information objects may be considered to be within one of three categories: subjects, actions, and descriptions. Information objects in the subjects category may have a descriptor drawn from a pool of nouns that define different entities. For example, each subject information object may be an M2M application, an M2M device, an M2M gateway, M2M data, etc. Any other M2M entity is contemplated as a noun or descriptor in the subjects category. Note that while the pool of nouns used to describe objects in the subjects category may be static and fixed in some embodiments, in other embodiments the pool of nouns used to describe objects in the subjects category may be generated dynamically and/or updated to add or remove descriptors and according to the particular embodiment. All such embodiments are contemplated as within the scope of the present disclosure.

Subjects are also entities that perform actions and/or entities upon which actions are performed. Information objects in the actions category may have a descriptor drawn from a pool of verbs defining various actions that may be performed between multiple entities in the subjects category. Action information objects may be associated with complex actions that are not natively supported by underlying protocols and/or several actions that are aggregated. Action information objects may be re-used. Note that while the pool of verbs used to describe objects in the actions category may be static and fixed in some embodiments, in other embodiments the pool of verbs used to describe objects in the actions category may be generated dynamically and/or updated to add or remove descriptors and according to the particular embodiment. All such embodiments are contemplated as within the scope of the present disclosure.

Subject information objects and action information objects may be described by information objects in the descriptions category. A description information object may describe one or more characteristics, states, statuses, or any other attributes of the information object associated therewith. For example, a description information object may indicate the power status (i.e., on or off), the location, the owner, or the registration status of an associated object. Any other attribute or characteristic is contemplated. Description information objects may also be used to describe one or more other description information objects. As with subject and action information objects, the pool of terms used to describe objects in the descriptions category may be static and fixed in some embodiments, while in other embodiments the pool of terms used for description information objects may be generated dynamically and/or updated to add or remove descriptors and according to the particular embodiment. All such embodiments are contemplated as within the scope of the present disclosure.

Objects may be predefined so that different nodes will be able to use objects drawn from a common pool of objects. Service layers may also discover and exchange the objects that the respective service layer supports. As will be appreciated, this information model may have the advantage of reducing overhead over an interface because each information object is relatively small and therefore requires less processing and bandwidth to communicate between entities than larger, more complex objects and data constructs used in other information models.

Figure 4:
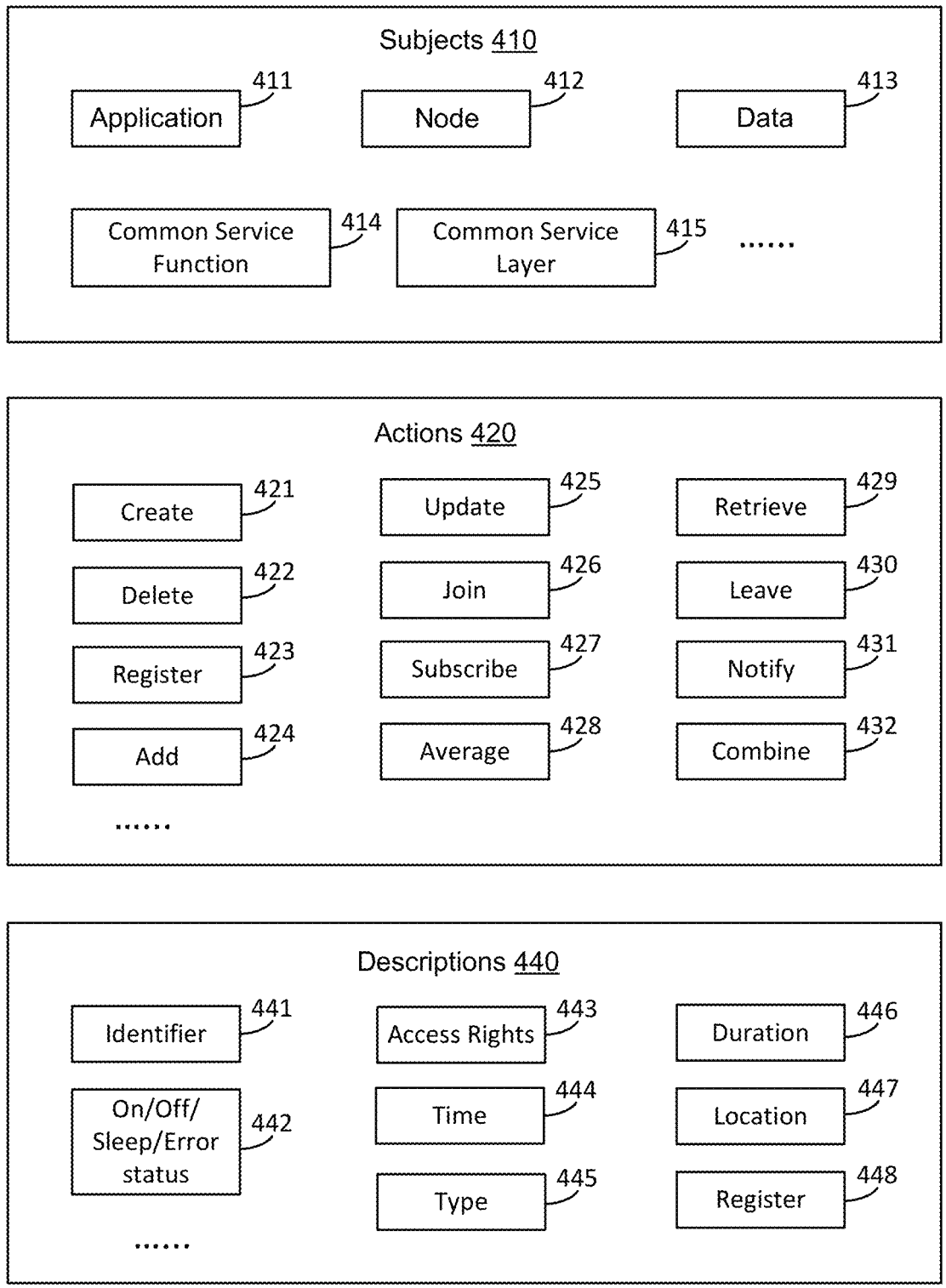
FIG. 4 illustrates an exemplary atomic information object structure.

FIG. 4 illustrates non-limiting, exemplary lists 410, 420, and 440 of objects that may be included in each category. Note that the objects shown in FIG. 4 are only examples, and any other objects that may be used in each of these categories are contemplated as within the scope of the present disclosure.

As noted above, objects in subjects category 410 may be described by nouns from a pool of nouns that describe various entities. Examples of objects in the subjects category include application 411, node 412, data 413, common service function (CSF) 414, and CSL 415. Other objects that represent or are otherwise associated with any type of M2M entity, device, or construct are contemplated as within the scope of the present disclosure.

Also as noted above, objects in actions category 420 may be described by verbs drawn from a pool of nouns that describe various entities and label an action that may be performed by one subject information object on another or between multiple entities in the subjects category. Examples of objects in the actions category include create 421, delete 422, register 423, add 424, update, 425, join 426 subscribe 427, average 428, retrieve 429, leave 430, notify 431, and combine 432. Other objects that represent or are otherwise associated with any type of action that may be performed by, on, or between any M2M entity, device, or construct are contemplated as within the scope of the present disclosure.

Also as noted above, objects in descriptions category 440 may describe one or more characteristics, states, statuses, or any other attribute of an information object with which it is associated. Examples of objects in the descriptions category include identifier 441, on/off/sleep/error status 442, access rights 443, time 444, type 445, duration 446, location 447, and register 448. Other objects that represent or are otherwise associated with any descriptor or indicator of any type of attribute or characteristic that may be associated with any action or subject information object or any M2M entity, device, or construct are contemplated as within the scope of the present disclosure.

As noted, in the disclosed embodiments an M2M system may define information objects statically or the M2M system may add and remove objects dynamically by discovering new information objects and detecting removed or deleted information objects. It is contemplated that information objects may be hosted by any type and number of nodes, entities, devices, applications, and any combination thereof.

Figure 5:
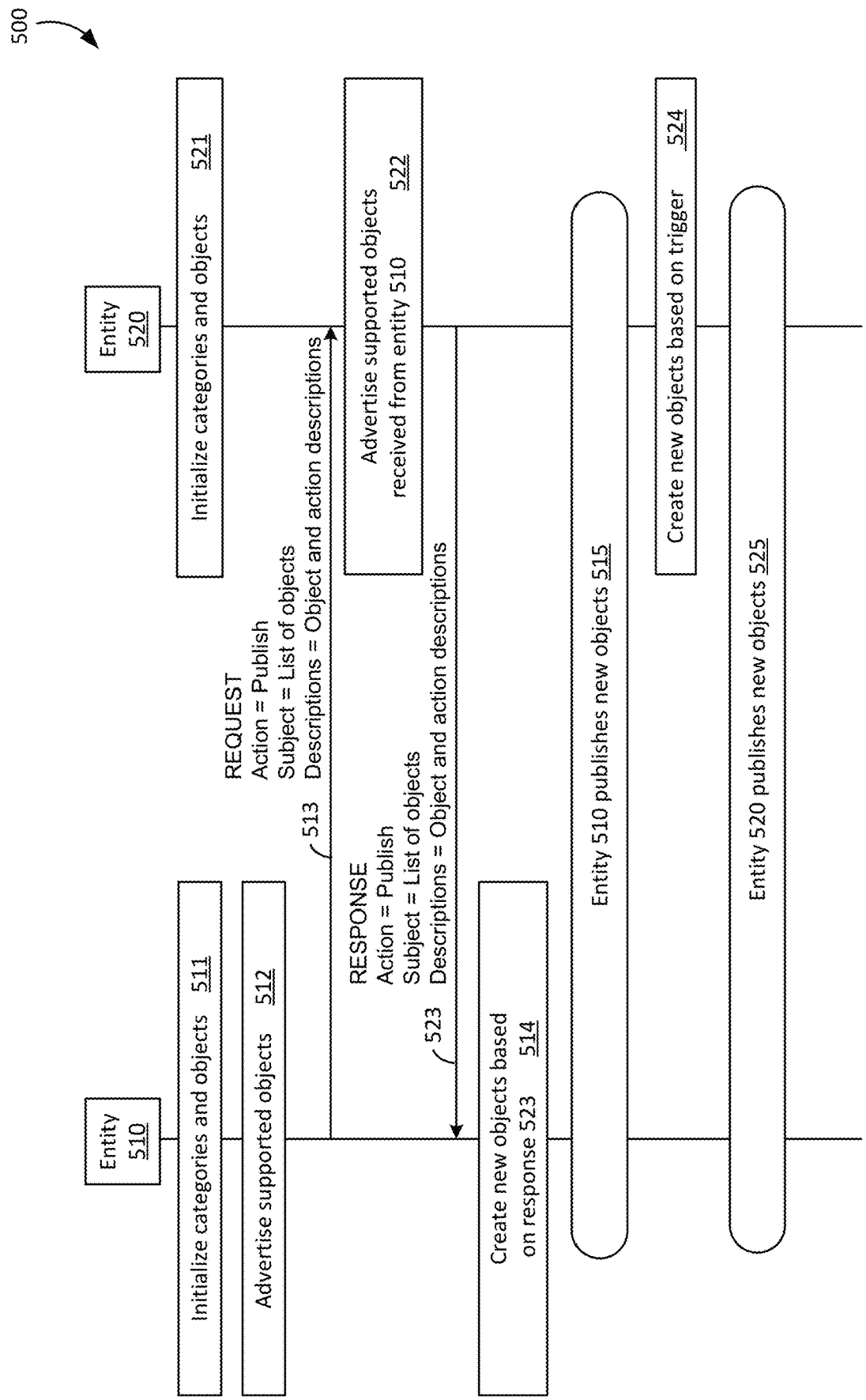
FIG. 5 illustrates a signal flow demonstrating an exemplary process for using the disclosed information model.

Each entity (e.g., devices, applications, nodes, resources, etc.) may create new information objects and may advertise them and exchange information object information with other entities. This may allow the entities to acquire knowledge of the resources and services that may be available from other entities. FIG. 5 illustrates exemplary, non-limiting signal flow 500 that demonstrates how such knowledge exchanges may be implemented in the disclosed embodiments.

In FIG. 5, entity 510 and entity 520 may each be any type of entity, including a device, a gateway, a network node, or an application. Entity 510 may initialize its information object categories and supported objects at block 511 while entity 520 may do the same for its information object categories and supported objects at block 521. In some embodiments, the initially supported objects may be determined while the respective entity is provisioned and/or configured. At block 512, entity 510 may determine that it will advertise its supported objects and may therefore send publication request 513 to entity 520 with the indications of the information object action, which may indicate the action of "publish", the information object subject that may include a list of supported objects, and the information object description that may include descriptors of the supported objects and associated actions.

In response, entity 520 may simply acknowledge request 513 in a response message, may send no communication to entity 510, or may take no responsive actions. Alternatively, entity 520 may announce its supported objects to entity 510 by sending response 523 to entity 510 in response to request message 513. In an embodiment, an entity may create new objects based on objects advertised by other entities, thereby enhancing its own information model. Thus, at block 514, entity 510 may create new objects that correspond to those indicated by entity 520 in response 523. At block 515, entity 510 may publish (i.e., advertise or announce) the new objects created at block 514 and/or previously existing objects so that other entities, including entity 520, are aware that entity 510 is capable of providing access to the advertised objects and/or facilitating the services and functions related to the advertised objects.

Alternatively, or in addition, an entity may create new objects based on a trigger or a policy applied to that entity. Hence, at block 524, entity 520 may create one or more objects based on a detected trigger. Such objects may include objects provisioned on entity 520, objects created by entity 520 based on its organization and/or combining of objects (as described in more detail below), and/or objects created in response to requests received from applications. Triggers contemplated may be any detectable condition, data, or stimulus that an M2M entity may be capable of detecting. Note that entity 520 may also delete objects in response to triggers, provisioning, and/or requests from applications. Examples of triggers include the receipt of an advertisement or an advertised object from another entity (e.g., as in publication 515 described above and publication 525 described below), triggers based on local policies, and triggers based on the entity's service capability that may detect conditions that indicate a need to organize and/or combine objects. An entity may also be triggered to create a new objects due to the provisioning a new service enablement and the receipt of a request to create an object from an application. These and any other triggers and conditions under which an entity may be caused to create an object are contemplated as within the scope of the present disclosure.

At 525, entity 520 may publish (i.e., advertise or announce) the new objects created at block 524 and/or previously existing objects so that other entities are aware that entity 520 is capable of providing access to the advertised objects and/or facilitating the services and functions related to the advertised objects.

In an embodiment, each information object may have any number of instantiations, which may be referred to as "object instances." Object instances may have relatively unique identifiers (IDs) and may be addressable using such IDs. In one embodiment, an object instance identifier may be a URI that represents an addressable location for the object instance. Subjects, actions, and descriptions may not have any built-in hierarchical relationship, so, for example, a service provider "ProviderOne" may arrange the three object categories under a root address, such as "www.ProviderOne.com/Subjects/", "www.ProviderOne.com/Actions/", and "www.ProviderOne.com/Descriptions/". In this example, object instances in each object category may be represented as "www.ProviderOne.com/Subjects/CSF/csfl/", "www.ProviderOne.com/Actions/CreateRoomTempControl/", and "www.ProviderOne.com/Descriptions/ID1/". Information objects and object instances may each be addressed by their relative addresses to reduce the length of a respective ID.

FIG. 6 illustrates exemplary, non-limiting object instance 600. Information in or associated with object instance 600 may include instance value 610 that may be stored and/or communicated in various forms, including a numeric value, a string, a structure, etc. Instance value may be a single value or it may be a set of values that may be individually addressed.

Object instance 600 may also contain various other information, all of which may be optional and therefore may not be present in every object instance. Such information may include search tag 620 that may be used for discovery. In some embodiments, multiple object instances may be related and thus each related instance may have the same search tag. In such embodiments, the common service layer of the node in which such instances may reside may combine information associated with such instances.

Object instance 600 may also contain object category 630 and object type 640 that may indicate the category and type of object 600. Among the other information that may be present in object instance 600 is own identifier 650 that may be set to an identifier of object 600, such as a relatively uniquely URI or some other identifier. Object 600 may also include description 660. Description 660 may also be stored as "attributes" at the same address as the subject or action with which description 660 is associated. Indicators of multiple descriptions may be contained in description 660, thereby providing combined information. If object instance 600 is associated with one or more other instances, the identifier(s) of the associated instances may be included in identifiers of associated instances 670.

In an embodiment, having descriptions as a separate category may help improve information organization flexibility. For example, 1000 instances of a sensor subject may all have the same location. In such embodiments, each of the sensors may associate with a single location object instance thereby preventing the need to have the same location data stored repetitively for each of the 1000 sensor instances.

FIG. 7 illustrates exemplary, non-limiting data information object instance 700 that may be associated with a meter (e.g., electricity meter, water meter, gas meter). Data value (i.e., instance value) 710 may be 1000. In this example, data information object instance 700 may also have two search tags in search tag field 720, one indicated as "meter1Reading2013" that may facilitate searching this meter's reading in 2013 and one as "HydroXmeterReading2013" that may indicate that this data belongs to the search results of Hydro company X's meter reading in 2013. Object category 730 may be set to "subject" and object type 740 may be set to "data". This data instance may be uniquely identified by its URI as "/www.HydroX.com/Subjects/meter1Data-12/01/2013" in own identifier field 750. In description field 760 may be an indicator of "meter1" that may provide a descriptor that is relative to other sensors in the same location and/or any other descriptive data. Object 700 may be associated with two other instances included in identifiers of associated instances 770. One of these may be a description for meter reading data stored as a description instance while the other may indicate that a Hydro company control application is stored as an instance of a subject information object.

Figure 8:
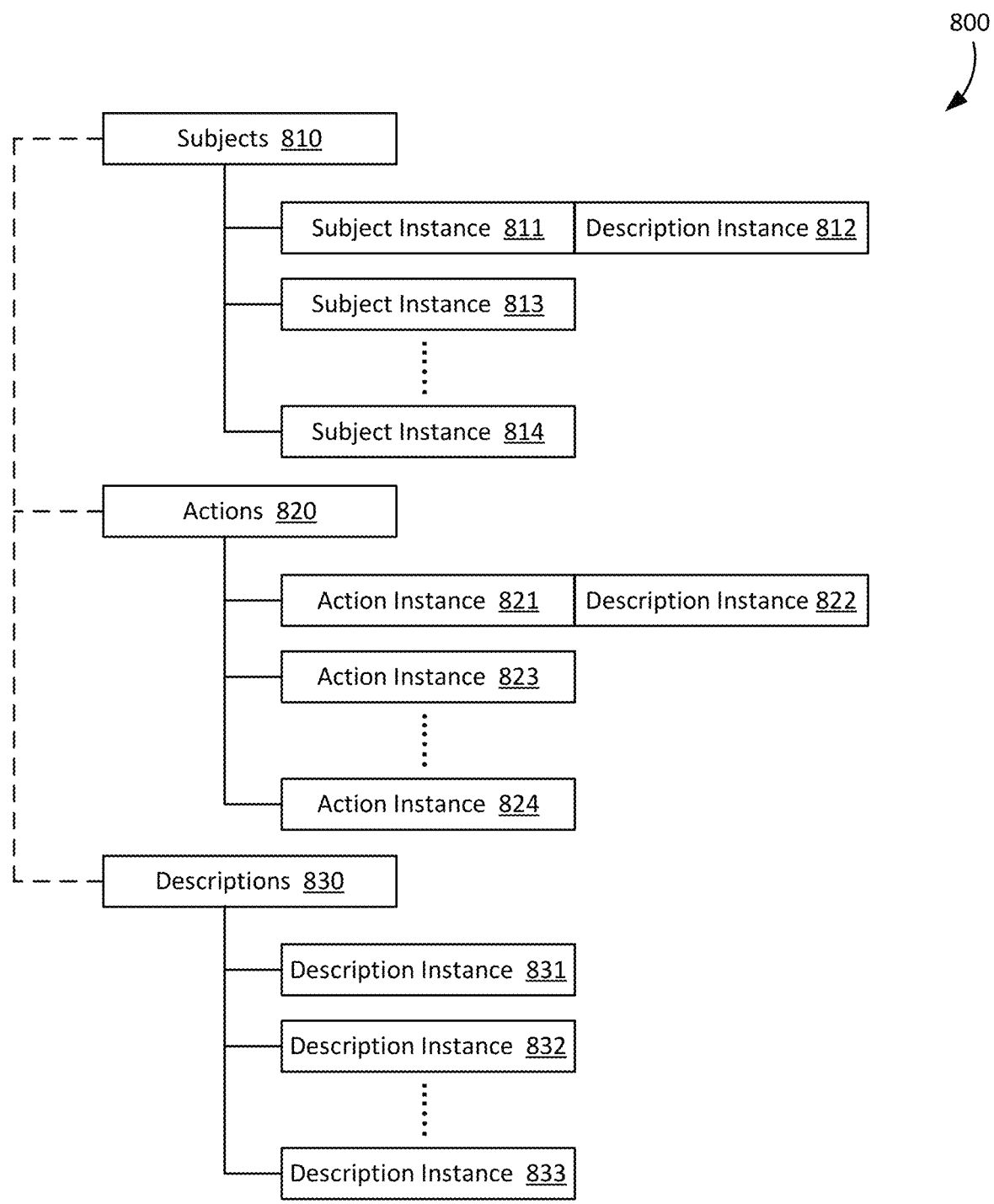
FIG. 8 illustrates an exemplary resource tree structure.

FIG. 8 illustrates non-limiting, exemplary structure 800 demonstrating an embodiment of information storage for an entity. Note that an entity as described herein may be a device, a gateway, a network server, a network node (e.g., router, hub switch, etc.), an application, or any other device or construct that is a component in a network of communicatively connected entities. Under subjects 810 may be any number of subject instances 811-814, while under actions 820 may be any number of action instances 821-824, and under descriptions 830 may be any number of description instances 831-834.

In an embodiment, each information object category may be an independent resource structure. Each instance of such objects may be considered to be stored directly under its category in the disclosed information model. Information object categories may be stored at separate locations and/or on separate devices. Alternatively, information object categories may be stored together at a single location, which is indicated by the dashed line in FIG. 8.

Description instances 831-833 may be stored separately, at separate locations and/or on separate devices, or in separate memory space in a single location, rather than together with a subject instance or an action instance like description instance 812 and description instance 822.

Figure 9:
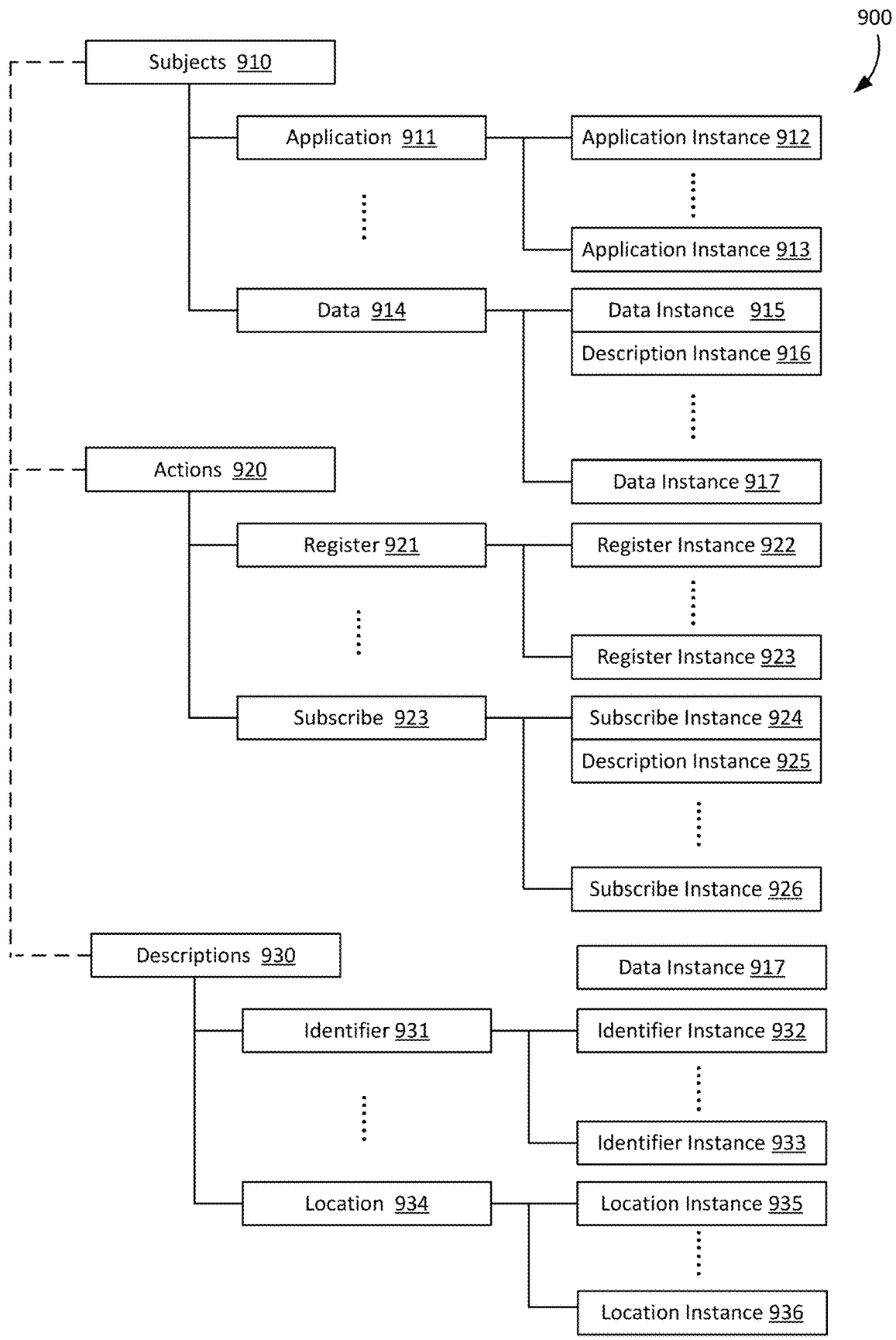
FIG. 9 illustrates an exemplary resource tree structure.

FIG. 9 illustrates non-limiting, exemplary structure 900 showing an alternative embodiment that provides a structure for use in the disclosed information model implemented in an entity. Under subjects 910 may be any number of subject instances organized by particular subjects, such as the object instances under application 911 and data 914. Under actions 920 may be any number of action instances organized by particular actions, such as the object instances under register 921 and subscribe 923. Under descriptions 930 may be any number of description instances organized by particular descriptions, such as the object instances under identifier 931 and location 934.

In this embodiment, each type of object defined under an object category may be a branch, although the instances may have no hierarchical relationship. For example, application branch 911 under subjects 910 in FIG. 9 may have associated subject instances that may be application instances 912 and 913 while data branch 914 under subjects 910 may have associated subject instances that may be data instances 915 and 917. As with the tree structure of FIG. 8, description instances may be stored with their associated action or subject. For example, in FIG. 9, description instance 916 may be stored with its associated subject instance data instance 915.

Similarly, register branch 921 under actions 920 may have associated action instances that may be register instances 922 and 923 while subscribe branch 923 under actions 920 may have associated action instances that may be subscriber instances 924 and 926. Again, as with the tree structure of FIG. 8, description instances may be stored with their associated action or subject. For example, in FIG. 9, description instance 925 may be stored with its associated action instance subscribe instance 924.

Description instances such as identifier instances 932-933 under identifier 931 and location instances 935-936 under location 934 may be stored separately, at separate locations and/or on separate devices, or in separate memory space in a single location, rather than together with a subject instance or an action instance like description instance 916 and description instance 925.

Figure 10:
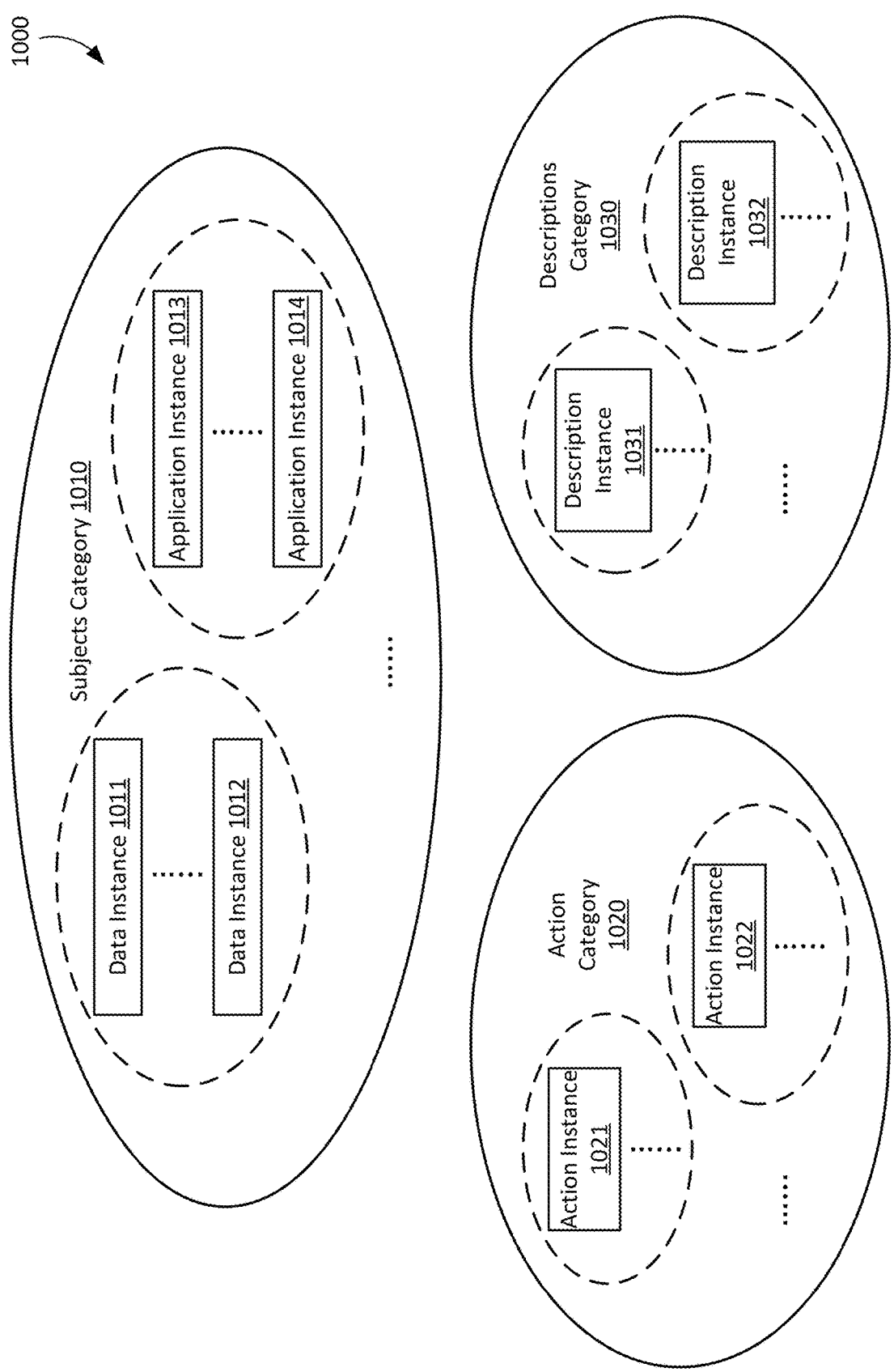
FIG. 10 illustrates an exemplary information object organizational structure.

The object-based information model of the instant disclosure may enable a flexible means of storing information. FIG. 10 illustrates another non-limiting, exemplary alternative structure 1000. In this embodiment, information instances are loosely stored at various locations and they are not considered to be organized in any type of tree structure. The correlations between instanced are fully represented by the associations between the instances. In FIG. 10, the categories (i.e., subjects, actions, descriptions) and the types within each category (data, application, etc.) are shown in dotted circles since these instances are just grouped logically, and not necessarily by their physical locations. For example, in subject category 1010, data instances 1011-1012 (may be any number of such instances) are grouped logically while application instances 1013-1014 are grouped logically. Likewise, in this example action instance 1021 may be grouped with action instances of the same type in action category 1020 while action instance 1022 of a different type of action than action instance 1021 may be grouped with other actions that are the same action as action instance 1022. Also in this example description instance 1031 may be grouped with description instances of the same type in description category 1030 while description instance 1032 of a different type of description than description instance 1031 may be grouped with other description that are the same action as description instance 1032.

Figure 11:
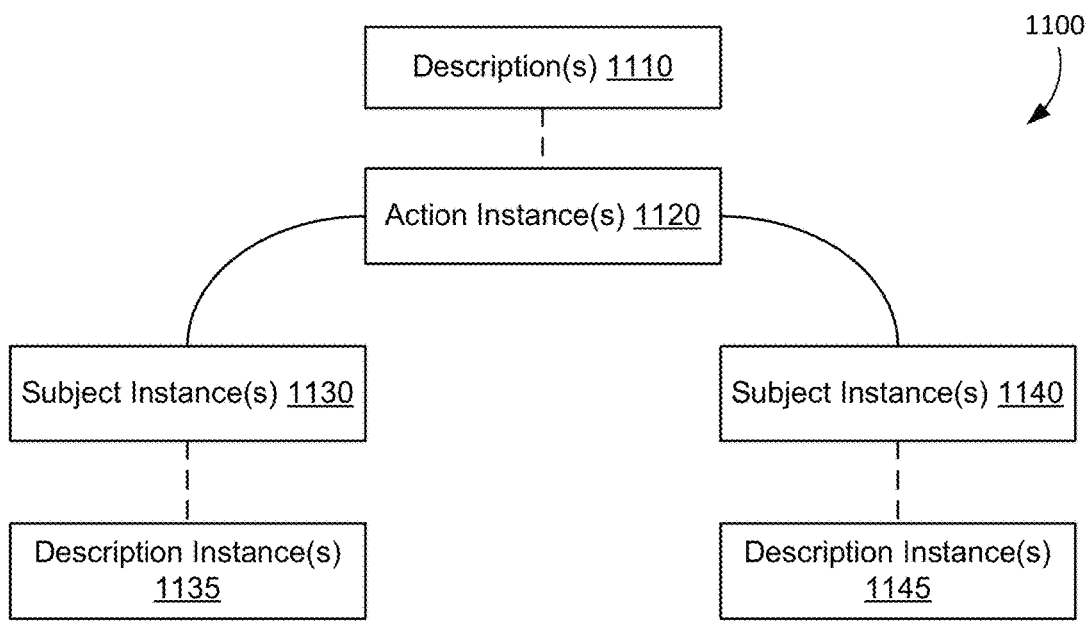
FIG. 11 illustrates an exemplary information object relationship structure.

FIG. 11 illustrates the relationship between the instances of various information objects belonging to different categories. Each action instance 1120 may have an associated description instance 1110 that may define attributes and/to characteristics of action instance 1120. Action instance 1120 may be an operation that may be performed between two or more subject instances, such as subject instances 1130 and 1140. Each of subject instances 1130 and 1140 may also have associated description instances 1135 and 1145, respectively, that may define attributes and/to characteristics of those subject instances.

An atomic information object may be associated with other atomic information objects to form new information. Associated information objects may also form groups having common characteristics. Such groups may facilitate more efficient operations. For example, discovery may be made more efficient because one discovery query may generate results that include multiple correlated information objects.

Figure 12:
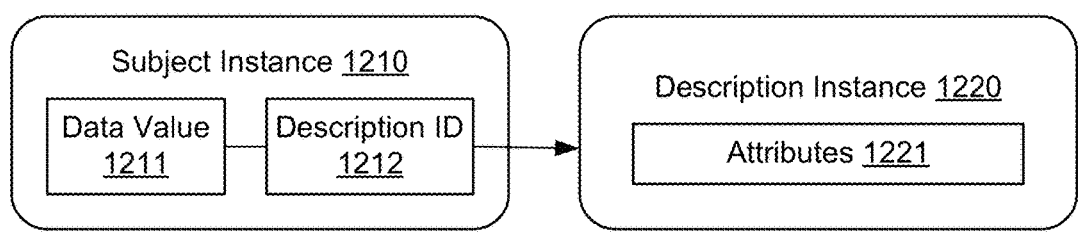
FIG. 12 illustrates exemplary information object instances.

FIG. 12 is a block diagram illustrating a mechanism that information objects as disclosed herein may use to associate with one another. Subject instance 1210 may be a data type subject instance. Subject instance 1210 may include a data value 1211 and a description identifier 1212. Description identifier 1212 may indicate a reference to, or otherwise provide a means to access, description instance 1220 that may include attributes 1221 associated with subject instance 1210.

Figure 13:
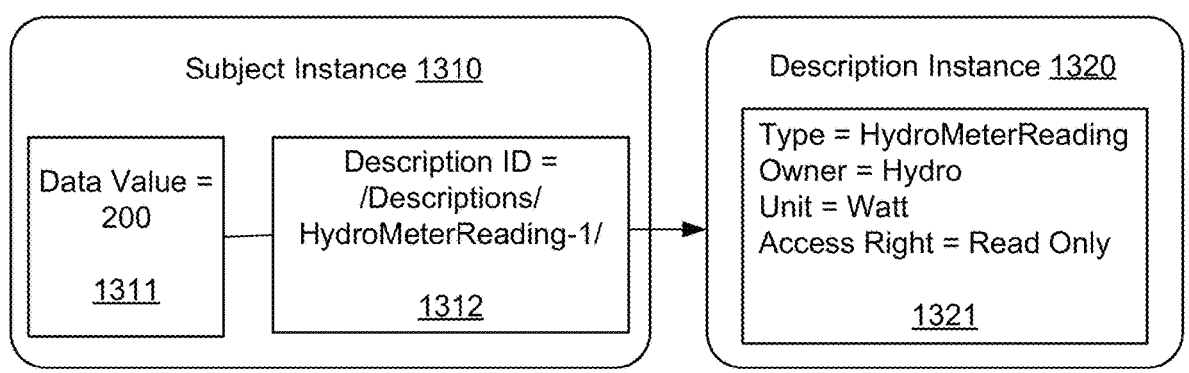
FIG. 13 illustrates exemplary information object instances.

FIG. 13 provides an example of such a mechanism. Subject instance 1310 may be a data type subject instance with data value 1311 set to 200. Description identifier 1312 may contain a URI (e.g., "/Descriptions/HydroMeterReading-1/" in FIG. 13) that is an address of description instance 1320. Description instance 1320 may include attributes 1321 associated with subject instance 1210. Attributes 1321 may include attributes that indicate a type of subject instance 1310, an owner of, or entity associated with, subject instance 1310, measurement units of data provided by subject instance 1310, and access rights to data provided by subject instance 1310.

Description instance 1320 may be associated to more than one subject instance. For example, where there are several temperature sensors in a building and all of the sensors are owned and/or operated by the same tenant, each of the sensors may have an associated subject instance that includes a description identifier that refers to description instance 1320. In such an embodiment, description instance 1320 may maintain a list of the subject instances with which it is associated. When a description instance is changed or removed, the corresponding subject instances may be automatically notified and the information management common service function may take actions to update the associations. Alternatively, each such subject instance may have a reference to a description instance that is unique to that subject instance and vice versa.

Figure 14:
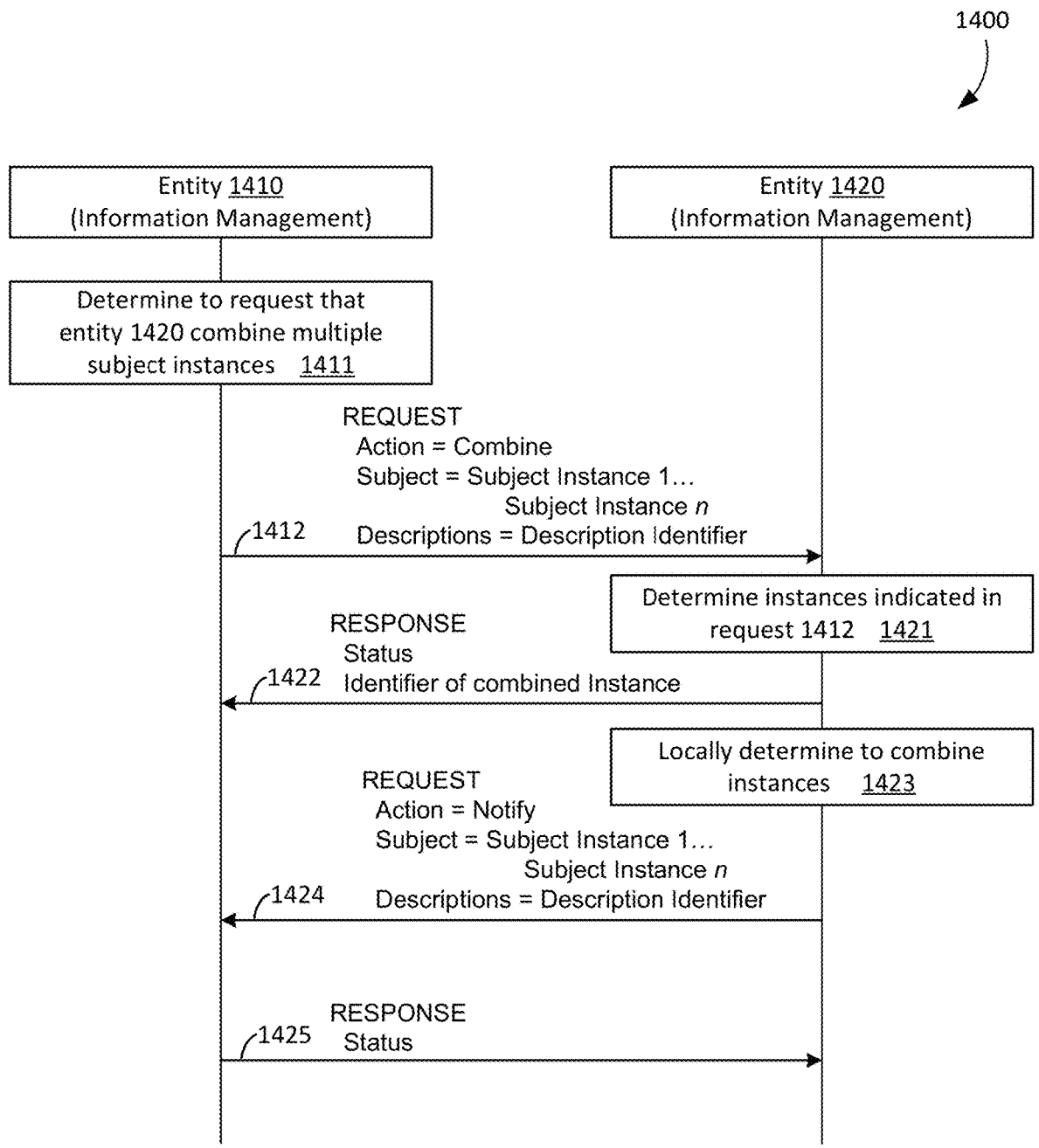
FIG. 14 illustrates a signal flow demonstrating an exemplary process for using the disclosed information model.

In some embodiments, an instance of an information object may be combined with one or more other instances to form a new object (i.e., a new instance comprising the combined instances and/or data associated therewith). FIG. 14 shows exemplary, non-limiting signal flow 1400 illustrating exemplary signals and procedures for combining instances.

At block 1411, entity 1410 (in some embodiments particularly its information management (IM) function) may determine to generate a request to be sent to entity 1420 to combine multiple subject instances. There may be various triggers or other stimulus that causes such an action to be initiated. For example, the IM function of entity 1410 may be configured to self-optimize data. Upon detection of several queries associated with the instances having the same or similar attributes, entity 1410 may determine to combine such instances based on criteria and/or policies configured at entity 1410. Alternatively, or in addition, in some embodiments an application that owns different object instances may generate a request to combine the instances.

Request message 1412 may be transmitted to entity 1420 indicating a "combine" action. Note that this combine action itself is an information object instance and may have associated description instance(s) that describe how the combination should be implemented. Request message 1412 may provide a list of instances to be combined. Request message 1412 may also provide descriptions for the combined instance, for example description data indicating that the instances to be combined are highly correlated. Upon receiving request 1412, at block 1421 entity 1420 may search its information storage, and/or any other data to which it may have access, and obtain information about the instances specified in request 1412. Upon acquiring any needed data, entity 1420 may create a new information object instance according to the instructions included in request 1412. Entity 1420 may then return the status of the operation and an identifier of the new instance in response message 1422. Also in response message 1422, in some embodiments as part of or the same as identifier of the new instance, may be an address for the newly created combined information object instance.

In another embodiment, entity 1420 may determine to combine multiple instances based on locally obtained data. For example, entity 1420 may be configured with a policy or other configuration that indicates that it should optimize information if possible. Upon determining to combine instances and performing the determined combining at block 1423, entity 1420 may send request message 1424 to entity 1410 notifying entity 1410 that the instances have been combined. Entity 1420 may also notify any other entities that may make use of such information, such as entities that are subscribed to notifications of one or more operations performed by entity 1420. Entity 1410 may transmit response 1425 to entity 1420 acknowledging receipt of request 1424 and/or providing a status based on the receipt of request 1424.

Figure 15:
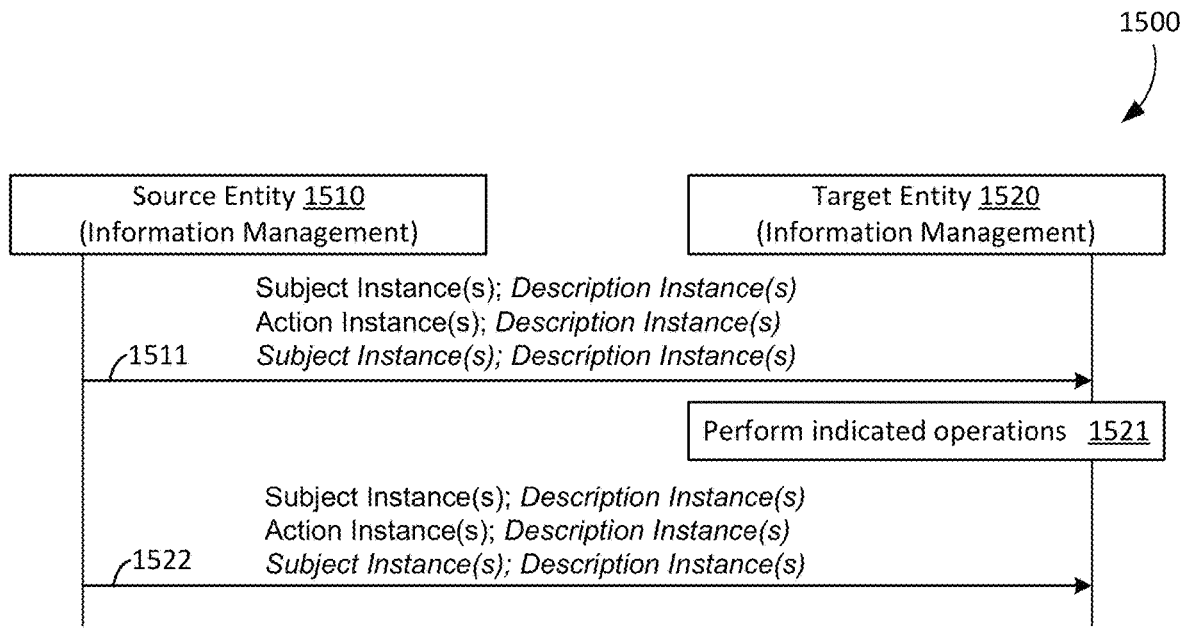
FIG. 15 illustrates a signal flow demonstrating an exemplary process for using the disclosed information model.

In an embodiment, application programming interface (API) operations may be simplified to facilitate an information model with a small "vocabulary." For example, as shown in FIG. 15 and exemplary, non-limiting signal flow 1500, the disclosed atomic information model allows the use of a unified API. Information exchanges between any two entities may be in the form of a subject instance that performs one more action instances on at least one other subject instance. Each of the subject instances and the action instances may have description instances associated therewith. Other fields may also be used (indicated in italics in FIG. 15). A receiving, or "target", entity may use the same structure in its messages sent in response. In this embodiment, API communications between the communicating entities may become a free flow of "sentences", which may increase system efficiency For example, source entity 1510 (in some embodiments particularly its information management (IM) function) may host an application that wants to write data to a common service layer (CSL) in a gateway such as target entity 1520. The application may generate, or cause or request to be generated, message 1511 that may specify a subject instance indicating an identifier of entity 1510 (or the application itself where it is its own entity), the action "create", and an identifier of the target instance (i.e., the gateway, which may be target entity 1520). Upon receipt of message 1511, target entity 1520 may perform the actions indicated in message 1511 at block 1521, such as writing data to its CSL. Entity 1520 may then send message 1522 to source entity 1510 indicating that it has performed the requested operations or that it was unable to perform the requested operations. For example, message 1522 may indicate the entities and actions involved as indicated in request 1511. Message 1522 may also indicate an identifier or location of the resulting product, such as the data stored in response to message 1511.

Note that in messages such as messages 1511 and 1522, multiple subject instances and/or multiple action instances may be indicated. There may be any number of subject instances and action instances, as well as their associated description instances. Where multiple subject instances are indicated with a single action instance, in some embodiments all indicated subject instances may perform the indicated action with/on each of the other indicated subject instances. Where there are multiple subject instances and multiple action instances, in some embodiments all indicated subject instances may perform the all the indicated actions with/on each of the other indicated subject instances. Multiple messages may also be combined to perform multiple actions with/on one or more target entities.

Figure 16:
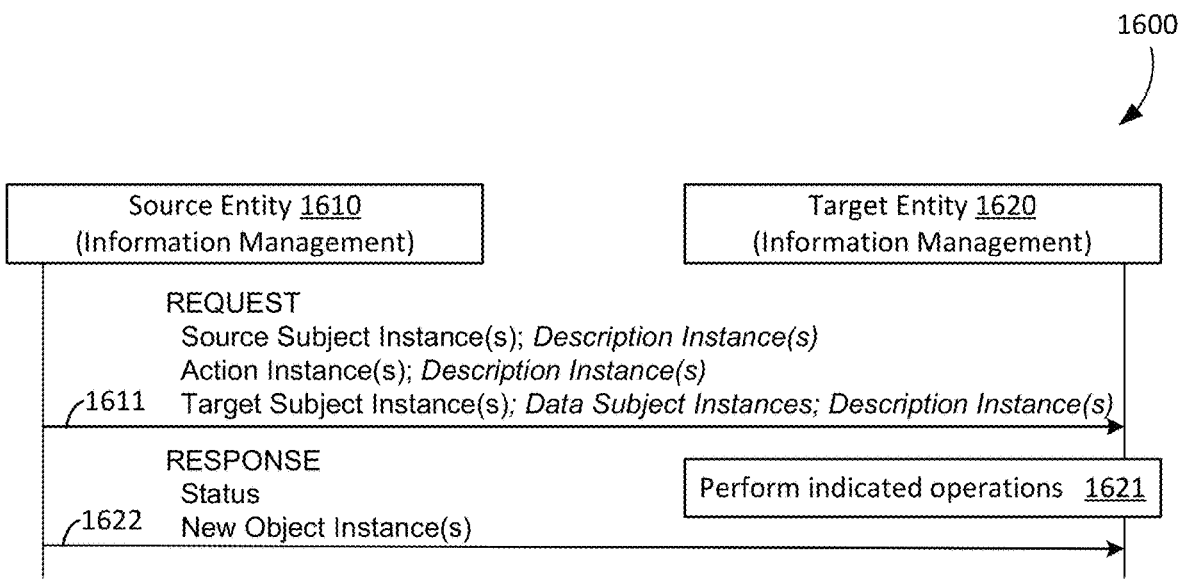
FIG. 16 illustrates a signal flow demonstrating an exemplary process for using the disclosed information model.

FIG. 16 illustrates exemplary, non-limiting signal flow 1600 that illustrates exemplary API operations that may be used in implementations of the disclosed information model. In this embodiment, the disclosed API operations may use request and response messages, but some embodiments do not require response messages. In this example, source entity 1610 may transmit request message 1611 to target entity 1620. Message 1611 may include an identifier of a source subject instance (e.g., a subject instance hosted on source entity 1610), identifiers of one or more target subject instances, and one or more actions that the source subject instance desires to have performed with/on each of the indicated target subject instances. In some embodiments, message 1611 may also include descriptions associated with the indicated subject and action instances. At block 1621, entity 1620 may attempt to perform the operations indicated in request 1611. Entity 1620 may report the results of attempting to perform the operations indicated in request 1611 in response message 1622. In some embodiments, a new instance of an information object may be created (e.g., a registration instance, a group instance reflecting combined instances, a data instance, etc.) in response to the operation(s) indicated in request 1611. In such embodiments, response message 1622 may include an identifier of the new object instance. Alternatively, or in addition, response message 1622 may include identifiers for any affected information object instances.

Figure 17:
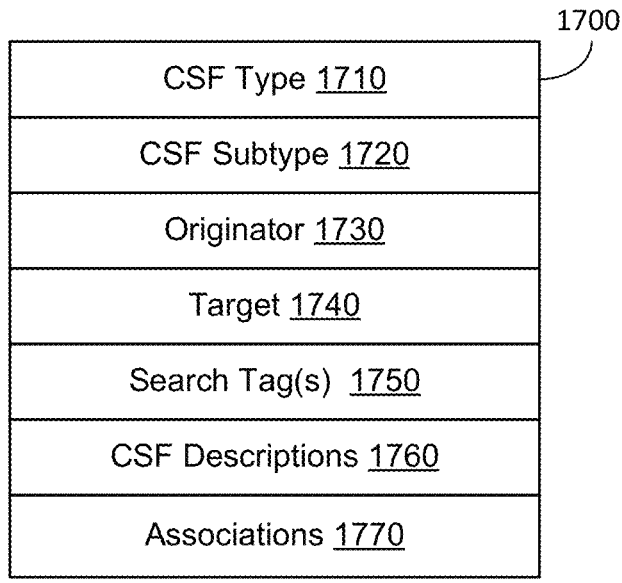
FIG. 17 illustrates an exemplary information object instance.

In other embodiments, an object may be based on a generic common service type where each Common Service Function (CSF) in a Common Service Layer (CSL) may be an instance of the object. For example, there may be object instances for registration, device management, interworking, etc. FIG. 17 illustrates exemplary, non-limiting object structure 1700 according to an embodiment. In this embodiment, the field CSF type 1710 may indicate the object's type or function (e.g., registration, device management) while the data in the field CSF subtype 1720 may further refine the object's type or function (e.g., application registration, device registration). The field originator 1730 may be used to contain data identifying the resource that initially generated the object. Target 1740 may be used to identify one or more resources with which the originating resource (identified in originator 1730) would like to perform the function indicated in CSF type 1710 and CSF subtype 1720.

Search tags 1750 may contain one or more strings that may be used to describe an instance of object 1700 and that may be used to assist in locating the instance of object 1700 in response to a search. CSF descriptions 1760 may contain one or more identifiers of description object instances that may be associated with the object instance implementing structure 1700. Associations 1770 filed may contain a list of identifiers of entities with which the object instance implementing structure 1700 may be associated or to which the object instance implemented using structure 1700 may be related.

In an embodiment, the path for a CSF may be defined as "<host name>/<CSF type>". For example, if the registration type for a function is defined as type one (1), the path to that CSF may be "http://www.serviceproviderl.com/oneM2M/1/". When an instance is created, the service platform (e.g., network, gateway, or device) may provide an identifier that is unique among identifiers used for entities using that platform. In such embodiments, an instance may be identified and/or addressed by a URI in the form of "<host name>/<CSF type>/<CSF instance ID>". For example, if a registration instance has an instance identifier of one (1), its path may be "http://www.serviceproviderl.com/oneM2M/1/1". Each element of a CSF instance may be addressable and/or identifiable by its respective identifier, which in some embodiments may be a URI such as "<host name>/<CSF type>/<CSF type instance ID>/<CSF type element ID>". Thus, the URI for element one (1) of instance one (1) of CSF type one (1) may be "http://www.serviceprovide1.com/oneM2M/1/1/1/". URIs may also be represented by a longer form that allows for more descriptive identifiers. For example, the URI for element one (1) of instance one (1) of CSF type one (1) may be "http://www.serviceprovide1.com/oneM2M/registrationType/registration1/registration/".

In an embodiment, an entity may have one or more instances of CSF objects stored in its information storage component (e.g., information storage 332 in FIG. 3). API operations may occur between the information management (IM) functions (e.g., information management 331 in FIG. 3) of the communicating entities. Messages exchanged by such functions may identify instances of CSF objects. The action object instances associated with such CSF object instances may be identified in the description instance associated with the respective CSF object instance. Alternatively, the action object instances associated with such CSF object instances may be stored separately from the CSF instance.

Figure 18:
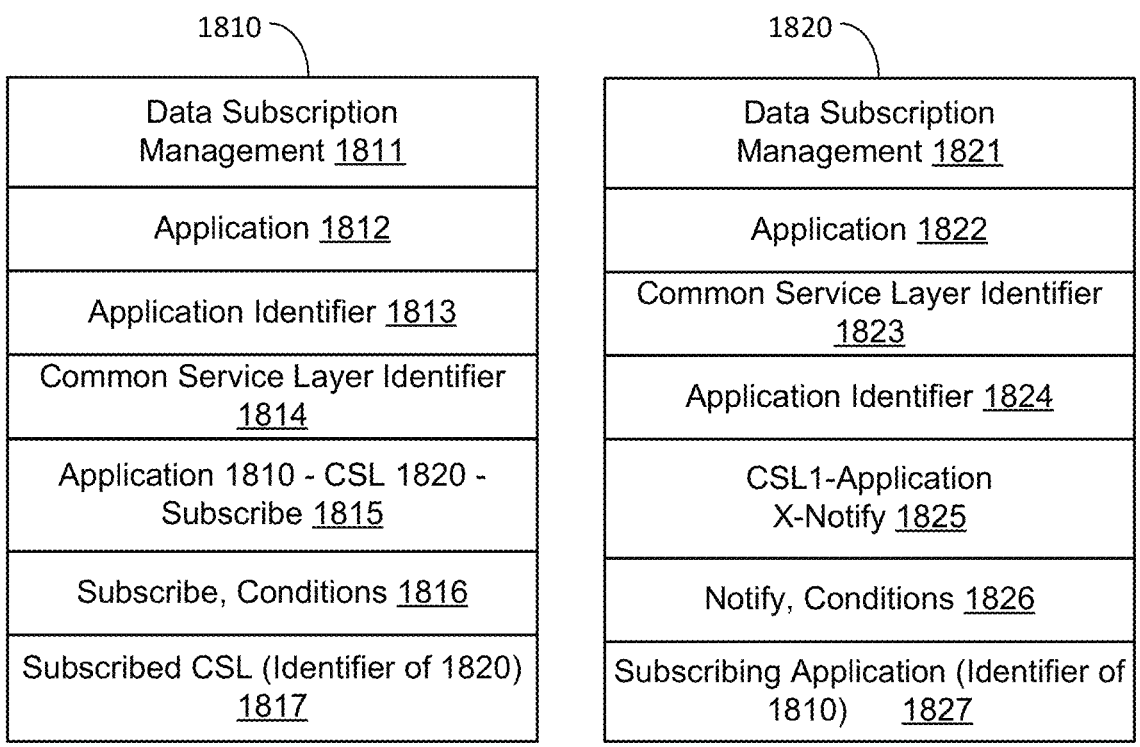
FIG. 18 illustrates exemplary information object instances.

In some embodiments, an object instance may subscribe to another object instance to proactively receive notifications from that object instance. FIG. 18 illustrates exemplary, non-limiting object structures 1810 and 1820 that will be used herein to illustrate an exemplary use case. In this example, application subscription instance 1810 may be used by a source application that desires to subscribe to CSL notify instance 1820. Application subscription instance 1810 may have data subscription management field 1811 that may relatively uniquely identify application subscription instance 1810 and may contain any other data needed to perform subscription operations. CSF subtype field 1812 may be set to "Application" while application identifier 1813 may identify the particular source application. Application subscription instance 1810 may also have CSL identifier 1814. In its "associations" element 1815, application subscription instance 1810 may have indicators of application subscription instance 1810, CSL notify instance 1820, and the relationship established between these instances (i.e., subscription). The conditions of the subscription may be indicated in descriptions field 1816 and may indicate the conditions and/or triggers that should cause CSL notify instance 1820 to send a notification to application subscription instance 1810. Field 1817 may contain an identifier of the subscribed object instance, which in this example is CSL notify instance 1820.

CSL notify instance 1820 may have data subscription management field 1821 that may relatively uniquely identify CSL notify instance 1820 and may contain any other data needed to perform subscription operations. CSF subtype field 1822 may be set to "Application" while application identifier 1824 may identify the particular source application (i.e. application identified in 1813 of object 1810). Application subscription instance 1810 may also have CSL identifier 1823 of object 1801 (i.e., the identifier of 1814). In its "associations" element 1825, CSL notify instance 1820 may have indicators of CSL 1823, application 1824, and the relationship established between these instances (i.e., notify). The conditions under which notification should be sent to application subscription instance 1810 may be indicated in descriptions field 1826 and may indicate the conditions and/or triggers that should cause CSL notify instance 1820 to send a notification to application subscription instance 1810. Field 1827 may contain an identifier of the subscribing object instance, which in this example is application subscription instance 1810.

Figure 19:
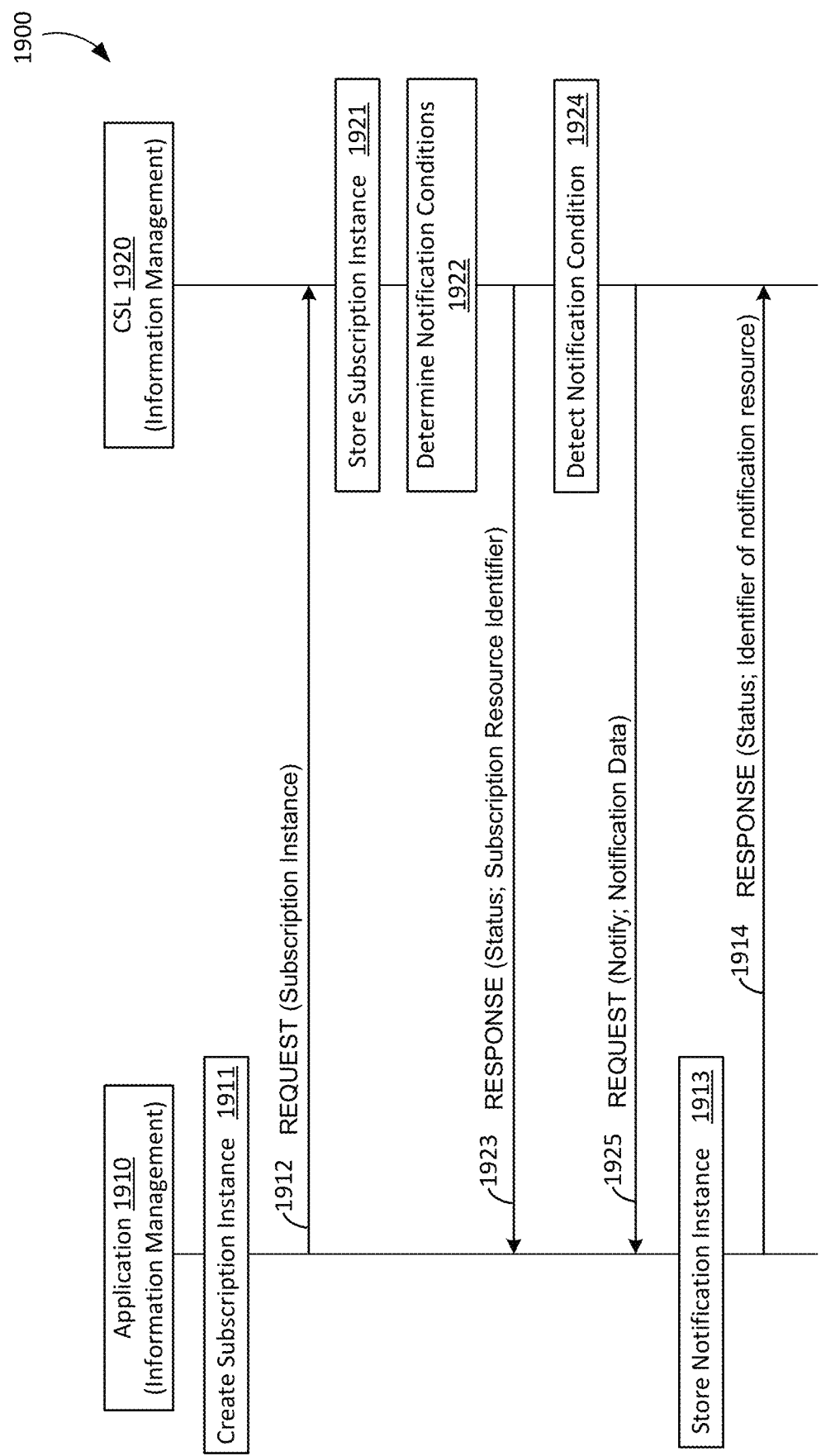
FIG. 19 illustrates a signal flow demonstrating an exemplary process for using the disclosed information model.

FIG. 19 shows exemplary, non-limiting signal flow 1900 illustrating an example of signals and procedures that may be used for embodiments where an entity subscribes to another entity. In this example, application instance 1910 may desire to subscribe to CSL instance 1920. Application instance 1910 may generate a subscription information object instance at block 1911. Application instance 1910 may transmit request message 1912 to CSL instance 1920. Request message 1912 may include an indicator or identifier of the generated subscription information object instance. At block 1921, CSL instance 1920 may create and store a subscription instance based on request 1912. At block 1922, CSL instance 1920 may determine and store notification conditions indicated in request 1912. CSL instance 1920 may send response message 1923 to application instance 1910 providing a status (e.g., successful, unsuccessful) of the processing of request 1912 and/or an identifier of the created subscription instance.

At block 1924, CSL instance 1920 may detect that a condition determined at block 1922 has been realized and, in response, may transmit notify request 1925 to application instance 1910 with a notification instance and/or notification data, in an embodiment of the type specified in request message 1912. At block 1913, application instance 1910 may generate and/or store a notification instance based on the received notification instance and/or data in request 1925. Application instance 1910 may transmit response 1914 to CSL instance 1920 indicating a status (e.g., successful, unsuccessful) of the processing of request 1925 and/or an identifier of the created subscription instance.

Figure 20:
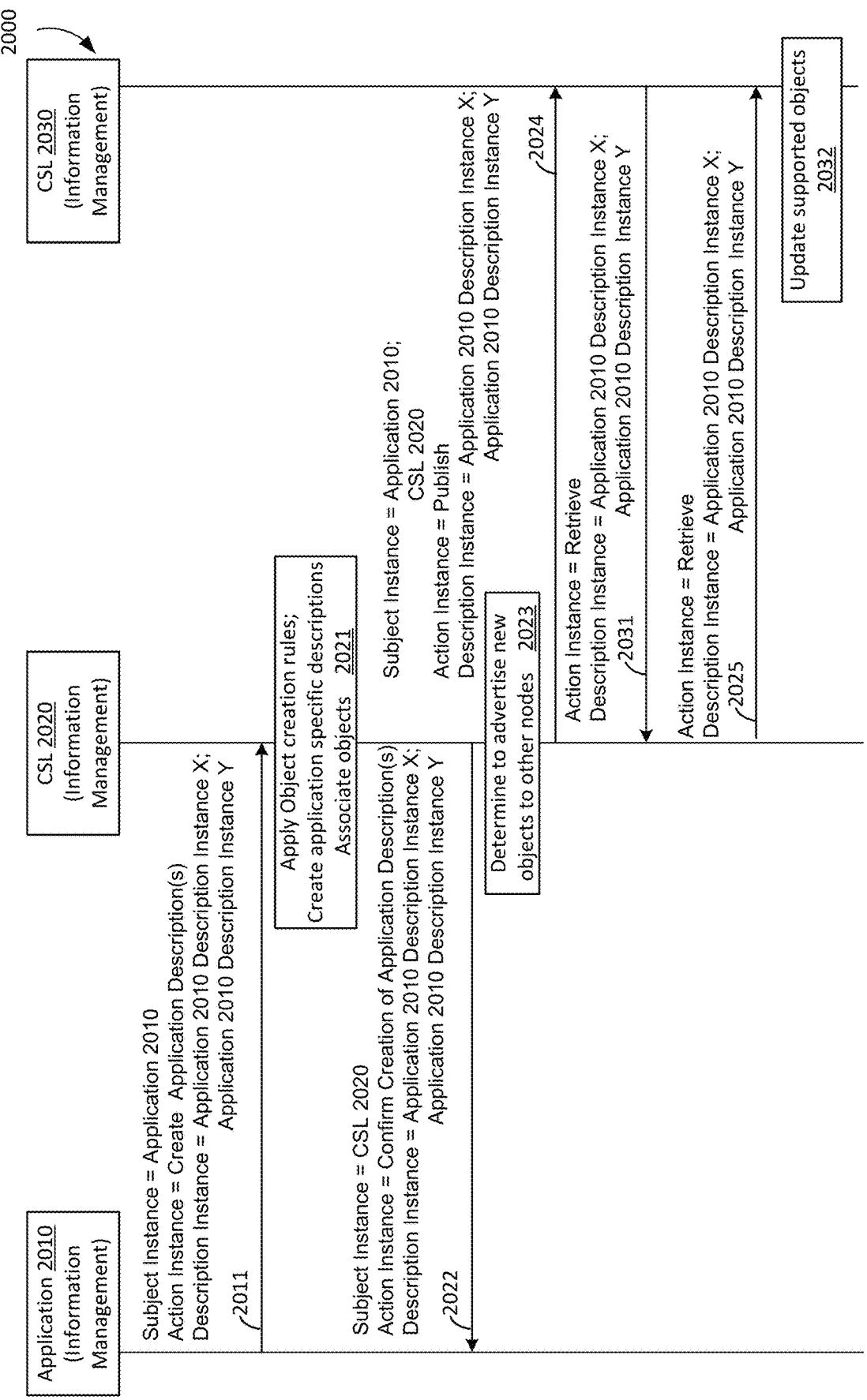
FIG. 20 illustrates a signal flow demonstrating an exemplary process for using the disclosed information model.

FIG. 20 shows exemplary, non-limiting signal flow 2000 illustrating an example of signals and procedures that may be used in embodiments where an entity defines its own objects that may be available in the CSL. An application executing on an entity may create objects that may be used privately by that application or that may be discoverable by other entities at the service layer. In the example illustrated in FIG. 20, application instance 2010 may have description instances X and Y that it may want to use as a basis for the creation of application specific instances of description objects. For example, description instances X and Y may be description instances that support a particular type of application for a specific industry.

In FIG. 20, application 2010 may transmit message 2011 instructing CSL instance 2020 (in some embodiments, particularly its information management (IM) function) to create new objects. The action indicated in message 2011 may be an action instructing the recipient to create application description object instances. The indicated action may have certain rules associated with it. CSL instance 2020 (in some embodiments, particularly its IM function) may follow such rules and create objects at block 2021 according to its object creation rules. CSL instance 2020 may transmit response message 2022 confirming the creation of the requested description object instances and providing identifiers of the description object instances. At block 2023, CSL instance 2020 may determine to advertise the newly created instances and, with message 2024, may advertise them to CSL instance 2030. CSL instance 2030 may retrieve one or more of the new objects with retrieve message 2031. Note that CSL instance 2030 may omit its own subject identifier in message 2031.

In this embodiment, application instance 2010 need not have a registration relationship with CSL instance 2020 as long as application instance 2010 is permitted to create new objects on CSL. Thus, this embodiment enables further facilitates the creation of objects at different nodes by various entities.

Figure 21A:
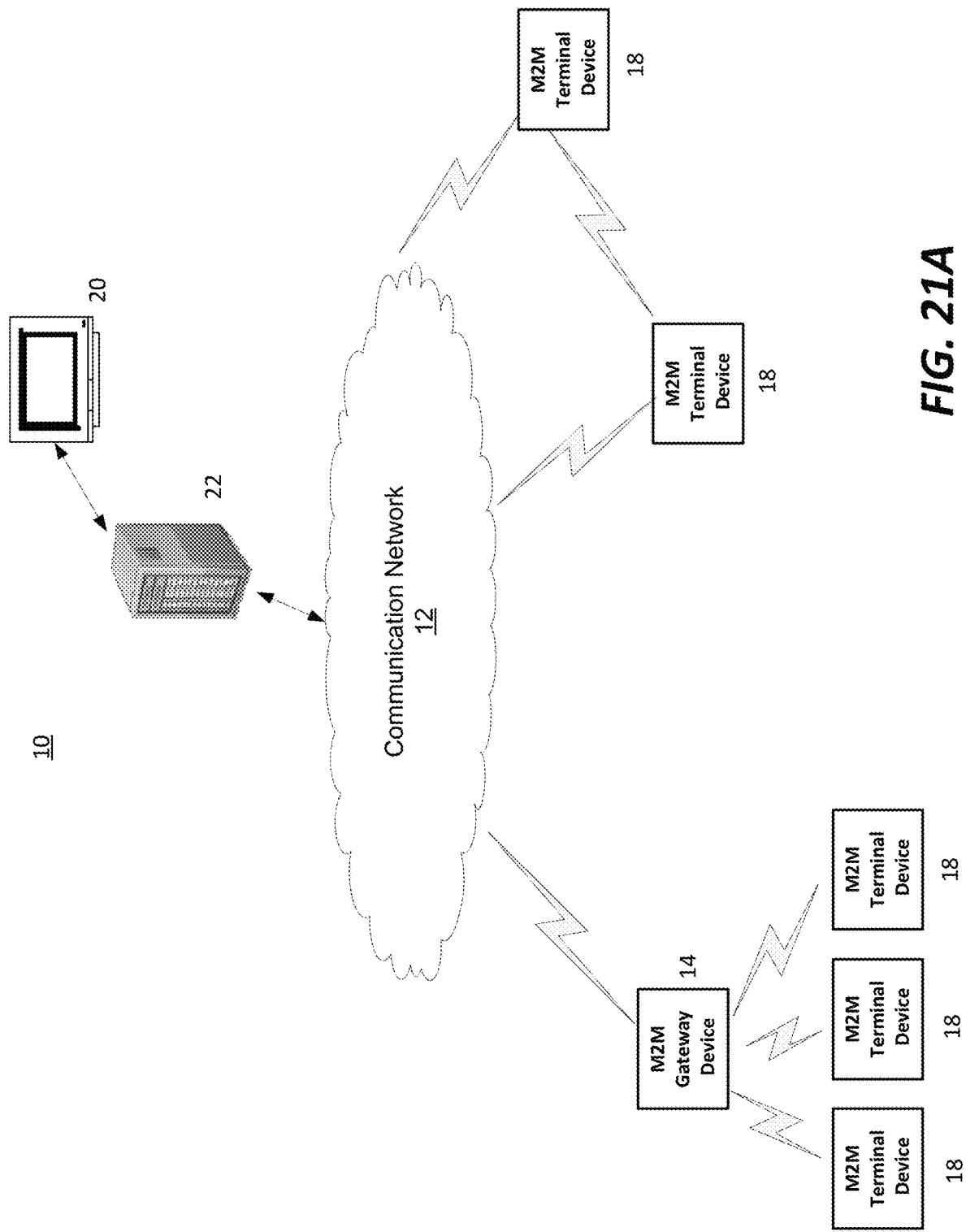
FIG. 21A is a system diagram of an example machine-to-machine (M2M) or Internet of Things (IoT) communication system in which one or more disclosed embodiments may be implemented.

FIG. 21A is a diagram of an example M2M or IoT communication system 10 in which one or more disclosed embodiments of systems and methods for implementing and using a lightweight IoT information model. Generally, M2M technologies provide building blocks for the IoT, and any M2M device, gateway, or service platform may be a component of the IoT as well as an IoT service layer, etc. A service layer may be a software middleware layer that supports value-added service capabilities through a set of Application Programming Interfaces (APIs) and underlying networking interfaces. Both ETSI M2M and oneM2M use a service layer that may implement and operate the disclosed lightweight IoT information model. ETSI M2M's service layer is the Service Capability Layer (SCL). The SCL exists within M2M Device (DSCL), Gateway (GSCL) and the Network (NSCL). The oneM2M service layer supports a set of Common Service Functions (CSFs) (i.e., service capabilities). An instantiation of a set of one or more particular types of CSFs may be referred to as a Common Services Entity (CSE) that may be hosted on different types of network nodes (e.g., infrastructure node, middle node, application-specific node).

As shown in FIG. 21A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC- FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. Such signals may enable the transmission of disclosed messages, such as the requests, responses, and other message shown in FIG. 5 (publication), FIG. 14 (combining, status, notification), FIGS. 15 and 16 (instance communications), FIG. 19 (subscription), FIG. 20 (creation of instances, publication), etc. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example. Any of the entities described herein, including any entities implementing or facilitating any of the disclosed information object instances, may be implemented, executed, or otherwise enabled, partially or entirely, on devices such as M2M devices 18, gateways 14, and service platform 22. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 21B:
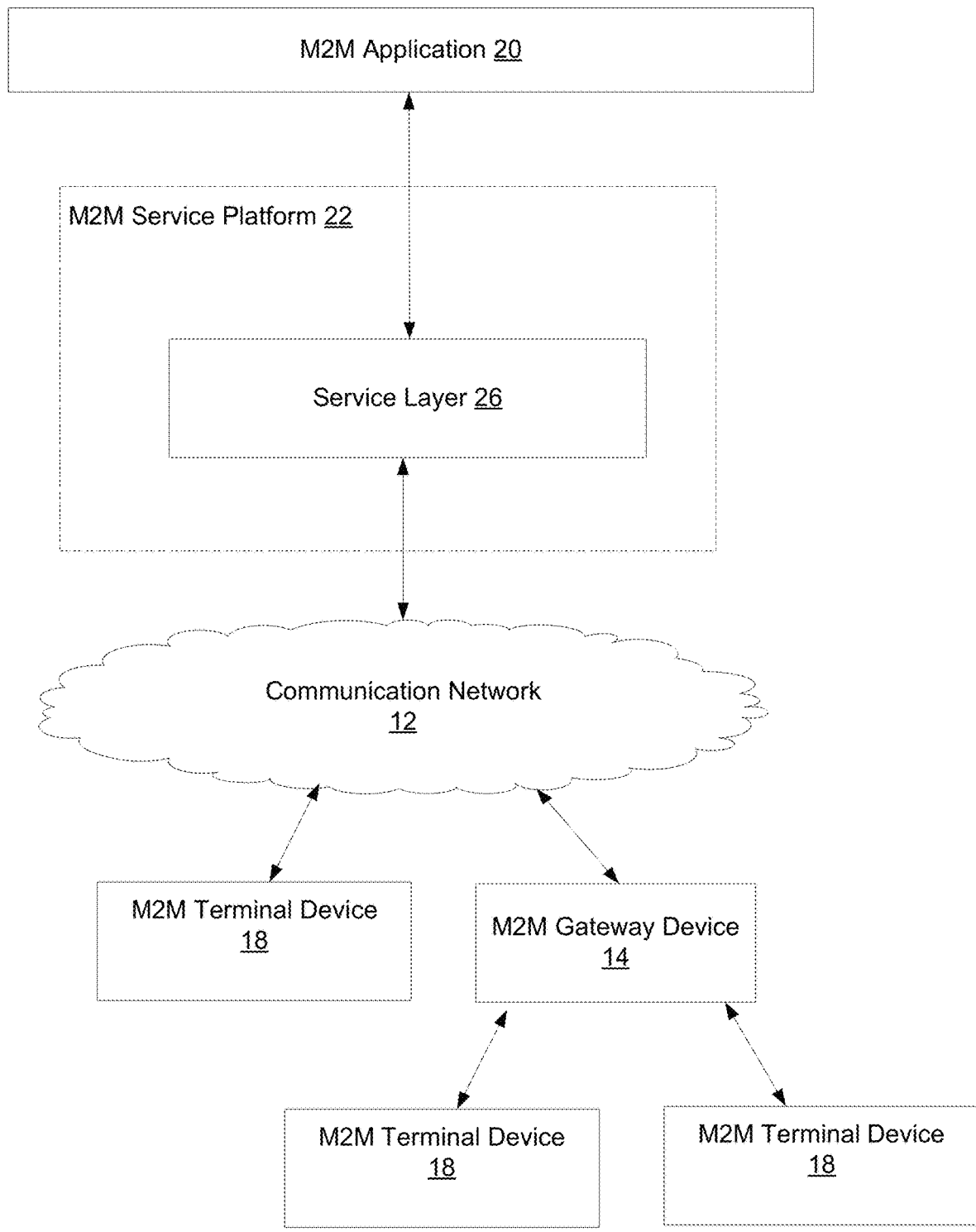
FIG. 21B is a system diagram of an example architecture that may be used within the M2M/IoT communications system illustrated in FIG. 12A.

Referring also to FIG. 21B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for implementing and using a lightweight IoT information model. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 21C:
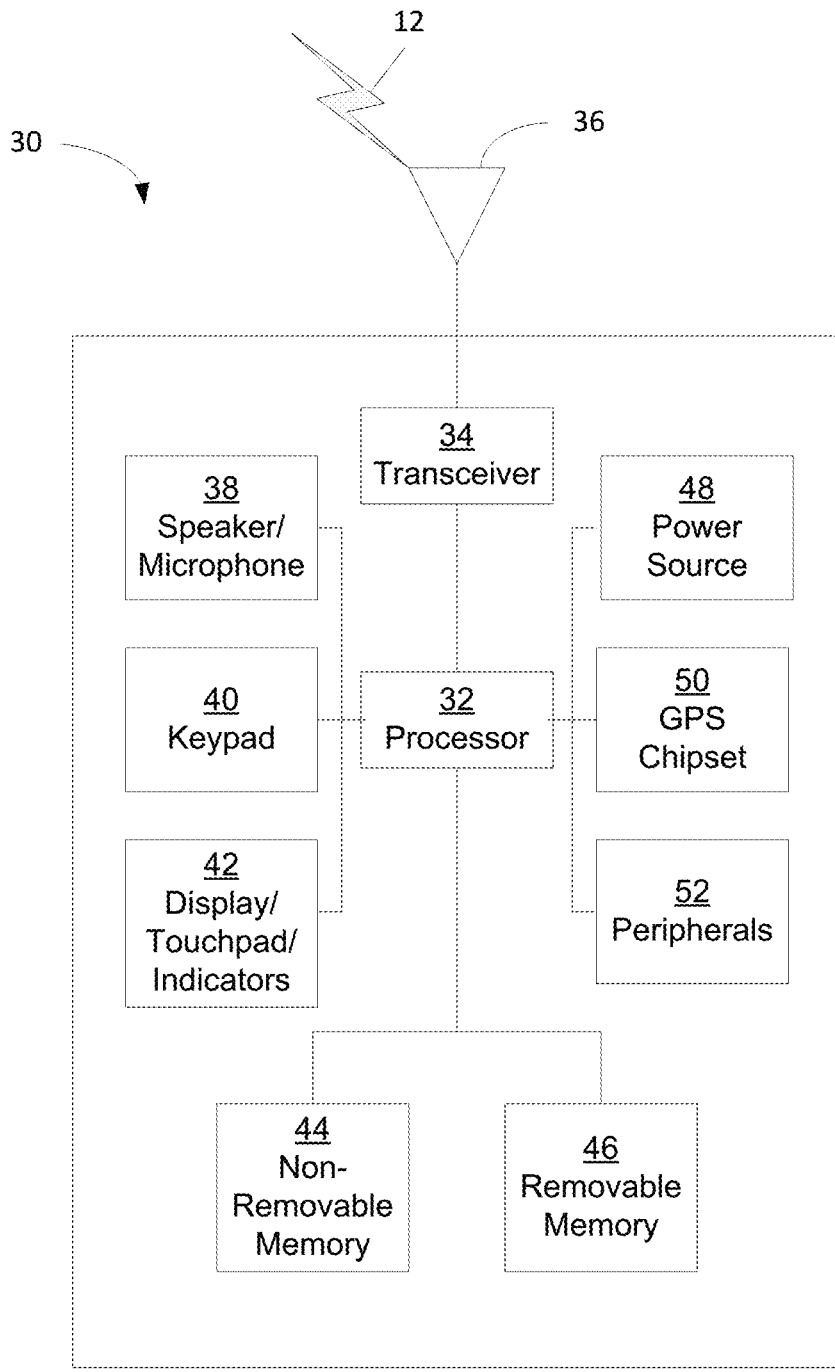
FIG. 21C is a system diagram of an example M2M/IoT terminal or gateway device that may be used within the communications system illustrated in FIG. 12A.

FIG. 21C is a system diagram of an example M2M device 30, such as an M2M terminal device 18 or an M2M gateway device 14 for example. As shown in FIG. 21C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for implementing and using a lightweight IoT information model.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 21C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as those described in some of embodiments set forth herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 21D:
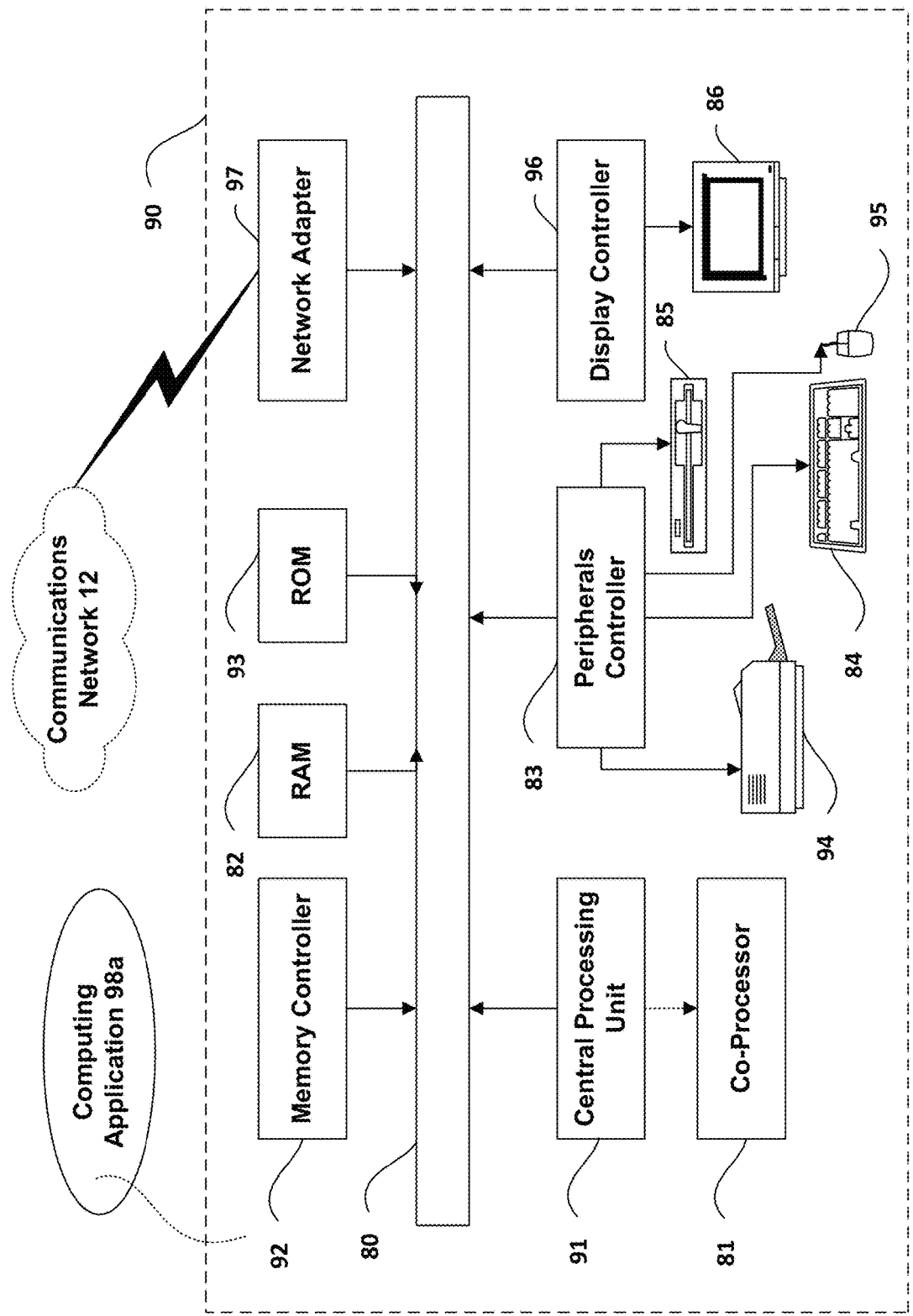
FIG. 21D is a block diagram of an example computing system in which aspects of the communication system of FIG. 12A may be embodied.

FIG. 21D is a block diagram of an exemplary computing system 90 on which, for example, the M2M service platform 22 of FIGS. 21A and 21B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for implementing and using a lightweight IoT information model.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 21A and 21B. In an embodiment, network adaptor 97 may receive and transmit data related to the disclosed systems and methods for implementing and using a lightweight IoT information model.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A first network apparatus in a network, the first network apparatus comprising:
    a memory comprising executable instructions; and
    a processor that, when executing the executable instructions, effectuates operations comprising:
    receiving, from a second network apparatus in the network, a RESTful request to create at least one application-specific instance of an information model object in a RESTful architecture, wherein the request comprises:
        at least one information model object description in the RESTful architecture, wherein the at least one information model object description is application-specific and is provided by a first entity executing on the second network apparatus; and
        wherein the at least one information model object comprises a description of a uniquely addressable resource in the network; and
        wherein the description comprises one or more characteristics, states, statuses, or any other attributes of the information model object; and
    creating the at least one application-specific instance of the information model object based on the at least one information model object description received from the second network apparatus;
        wherein the application-specific instance of a information model object is accessible via RESTful requests issued by other entities implemented on other network apparatuses in the network,
        wherein the request to create the application-specific instance of a information model object further comprises one or more object creation rules, and
        wherein creating the at least one application-specific instance of a information model object comprises creating the at least one application-specific instance of the information model object in accordance with the one or more object creation rules.

2. The first network apparatus of claim 1, wherein the operations further comprise restricting use of the at least one application-specific instance by only the first entity executing on the second network apparatus.

3. The first network apparatus of claim 1, wherein the operations further comprise transmitting a response to the second network apparatus via the communication network comprising a confirmation of the creation of the at least one application-specific object instance.

4. The first network apparatus of claim 1, wherein the operations further comprise transmitting a response to the second network apparatus in the network comprising an identifier for the at least one application-specific object instance.

5. The first network apparatus of claim 1, wherein the operations further comprise transmitting a response to the second network apparatus in the network comprising an attribute that identifies a type of the at least one application-specific object instance.

6. The first network apparatus of claim 1, wherein the operations further comprise advertising the at least one application-specific object instance to another network apparatus in the network.

7. The first network apparatus of claim 6, wherein the operations further comprise sending to the another network apparatus the at least one application-specific object instance in response to a retrieve message received from the another network apparatus.

8. The first network apparatus of claim 1, wherein the information model object is defined in a service layer of the network.

9. The first network apparatus of claim 8, wherein the service layer comprises common service layer function for M2M service.

10. The first network apparatus of claim 9, wherein the common service layer function is defined according to ETSI or oneM2M standards.

11. A method for a first entity in a network, the method comprising:
    receiving, from a second network apparatus in the network, a RESTful request to create at least one application-specific instance of a information model object in a RESTful architecture, wherein the request comprises:
        at least one information model object description in the RESTful architecture, wherein the at least one information model object description is application-specific and is provided by a first entity executing on the second network apparatus; and wherein the at least one information model object comprises a description of a uniquely addressable resource in the network; and wherein the description comprises one or more characteristics, states, statuses, or any other attributes of the information object; and creating the at least one application-specific instance of the information model object based on the at least one information model object description received from the second network apparatus;

wherein the application-specific instance of a information model object is accessible via RESTful requests issued by other entities implemented on other network apparatuses in the network, wherein the request to create the application-specific instance of a information model object further comprises one or more object creation rules, and wherein creating the at least one application-specific instance of a information model object comprises creating the at least one application-specific instance of the information model object in accordance with the one or more object creation rules.

12. The method of claim 11, further comprising restricting use of the at least one application-specific instance by only the first entity executing on the second network apparatus.

13. The method of claim 11, further comprising transmitting a response to the second network apparatus via the communication network comprising a confirmation of the creation of the at least one application-specific object instance.

14. The method of claim 11, further comprising transmitting a response to the second network apparatus in the network comprising an identifier for the at least one application-specific object instance.

15. The method of claim 11, further comprising transmitting a response to the second network apparatus in the network comprising an attribute that identifies a type of the at least one application-specific object instance.

16. The method of claim 11, further comprising advertising the at least one application-specific object instance to another network apparatus in the network.

17. The method of claim 16, further comprising sending to the another network apparatus the at least one application-specific object instance in response to a retrieve message received from the another network apparatus.

18. The method of claim 11, wherein the information model object is defined in a service layer of the network.

19. The method of claim 18, wherein the service layer comprises common service layer function for M2M service.

20. The method of claim 19, wherein the common service layer function is defined according to ETSI or oneM2M standards.

* * * * *